United States Patent
Zheng et al.

(10) Patent No.: US 9,826,289 B2
(45) Date of Patent: Nov. 21, 2017

(54) SENSOR, TELEMETER, WIRELESS SENSOR SYSTEM AND USE METHOD THEREOF

(71) Applicant: SH INFO TECH CO., LTD., Shanghai (CN)

(72) Inventors: Qihong Zheng, Shanghai (CN); Zechen Li, Shanghai (CN)

(73) Assignee: SH Infotech Co., Ltd., Shanghai (CN)

( * ) Notice: Subject to any disclaimer, the term of this patent is extended or adjusted under 35 U.S.C. 154(b) by 0 days.

(21) Appl. No.: 14/916,890

(22) PCT Filed: Sep. 5, 2013

(86) PCT No.: PCT/CN2013/083009
§ 371 (c)(1),
(2) Date: May 24, 2016

(87) PCT Pub. No.: WO2015/032054
PCT Pub. Date: Mar. 12, 2015

(65) Prior Publication Data
US 2017/0127155 A1    May 4, 2017

(51) Int. Cl.
G08C 19/16    (2006.01)
H04Q 9/00     (2006.01)
G06K 7/10     (2006.01)
H04L 29/08    (2006.01)

(52) U.S. Cl.
CPC .......... *H04Q 9/00* (2013.01); *G06K 7/10366* (2013.01); *H04L 67/12* (2013.01); *H04Q 2209/47* (2013.01)

(58) Field of Classification Search
None
See application file for complete search history.

(56) References Cited

U.S. PATENT DOCUMENTS

| | | | | |
|---|---|---|---|---|
| 7,446,660 B2 * | 11/2008 | Posamentier | .......... | G01K 1/024 340/10.41 |
| 7,952,482 B2 | 5/2011 | Malocha et al. | | |
| 2007/0064942 A1 * | 3/2007 | Talty | .................. | G08C 19/00 380/232 |

(Continued)

FOREIGN PATENT DOCUMENTS

| CN | 1302381 | 7/2001 |
|---|---|---|
| CN | 1906642 | 1/2007 |

(Continued)

OTHER PUBLICATIONS

International Search Report for international application No. PCT/CN2013/083009, dated Jun. 16, 2014 (4 pages).

*Primary Examiner* — Adolf Dsouza
(74) *Attorney, Agent, or Firm* — Hamre, Schumann, Mueller & Larson, P.C.

(57) ABSTRACT

A wireless sensor system includes a telemeter and at least one sensor. The sensor and the telemeter switch between a digital communication mode and an analog sensing mode, where the digital communication mode is used for finding and activating a target sensor on basis of whether or not a target address coding matches with a preset address coding, the analog sensing mode is used for transmitting an analog sensing signal of the target sensor to extract a to-be-extracted sensitive variable, remaining sensors are in a standby state and do not reflect a sensing signal, and only an address coding used for a chip select of sensors.

20 Claims, 8 Drawing Sheets

(56) References Cited

U.S. PATENT DOCUMENTS

2011/0285510 A1 11/2011 Malocha et al.
2014/0115493 A1* 4/2014 Kim .................. H04W 12/04
 715/748

FOREIGN PATENT DOCUMENTS

| CN | 101151510 | 3/2008 |
| CN | 101405751 | 4/2009 |
| CN | 101644616 | 2/2010 |
| CN | 201535702 | 7/2010 |
| CN | 102831457 | 12/2012 |
| CN | 103026369 | 4/2013 |

* cited by examiner

SENSOR, TELEMETER, WIRELESS SENSOR SYSTEM AND USE METHOD THEREOF

FIELD OF THE INVENTION

The present invention relates to a sensor system, and particularly to a sensor, a telemeter, a wireless sensor system and a use method therefor.

BACKGROUND OF THE INVENTION

Numbering a plurality of wireless sensors coexisting in a communication area and distinguishing the plurality of wireless sensors during monitoring may be generally referred to as a sensor multiple access technology, which has become one of core technologies of wireless sensor networks. Thereby, each measured sensitive variable can be associated with a sensor having a specific number, so as to determine a processing mode, calibration coefficients, a physical location and a measured object and so on for the sensitive variable, which is very beneficial to the monitoring and maintenance of system operation states. Especially for a wireless passive sensor, how to integrate a multiple access function without external power supply is a technical challenge which must be faced with.

There have been a variety of wireless passive sensors with RFID tags in the prior art. The Chinese patent applications No. CN200920108024.3 and No. CN20091008414.1 have disclosed a technology in which a plurality of delayed type reflecting gratings are parallelly connected on a surface acoustic wave wireless sensor. The reflecting gratings of this technology may constitute a plurality of peaks corresponding to a sensor number in a time domain transmitting signal of the sensor. A binary logic value of a bit is determined based on whether a reflection peak exists at a specific moment, which constitutes a multi-bit address code. The limitations of this technology lie in: firstly, as long as a sensor is within a communication of a telemeter, a reflected signal containing an address code and a sensitive variable is formed no matter whether the access is required, which causes conflicts with other similar sensors within the area so that the address and the sensitive variable cannot be determined. Secondly, an address code requires to be realized in a lithography process, which is expensive and cannot be rewritten. As to the above first limitation, a frequency division multiple access or a time division multiple access can be utilized in combination to avoid conflicts between a plurality of sensors, but it leads to an enhanced system complexity and meanwhile a reduced value of address codes. Alternatively, the U.S. Pat. No. 7,952,482B2 and the US application No. 2011/0285510A1 use different frequency orthogonal transmitting gratings, so that an orthogonal or a quasi-orthogonal OFC-PN code address sequence is formed. However, there is still an obvious use limitation, i.e. when a plurality of sensors coexist, clocks of reflected signals for all sensors are required to be strictly synchronized, otherwise a dislocation and overlapping of reflection peaks would appear, so that a sharpness of an autocorrelation function peak for an address code is greatly reduced which causes misreading, and sensitive information cannot be normally extracted. Furthermore, partial code capacity of PN code is sacrificed to ensure the sharpness of the autocorrelation function, so that a code word with a limited length can not be fully utilized.

In an apparatus of the Chinese patent No. CN200780009331.X, an array of sensors are integrated into a RFID modulator. Each sensor is connected to an independent logic gate circuit, so as to constitute a simple analog-digital signal converter. Binary states of these logic gates are inverted with state changes of the connected sensors, constitute a digital pulse sequence in terms of an order, and are reflected to a telemeter as a measuring code, and such a reflected signal is a pure digital communication code signal. The telemeter solves for a state of each sensor according to the measuring code after receiving the measuring code. The limitations of this apparatus lie in: firstly, an on/off state inversion occurs only at a preset threshold of a sensitive variable for each sensor, and a plurality of parallel similar sensors are required and different thresholds of a sensitive variable are set for purpose of fine measurement, which enhances complexity and cost; secondly, a logic gate circuit requires a direct power supply from a RFID power restorer, and the required power is increased with an increase of the monitoring solution and the number of sensitive variables, so that monitoring distance is reduced. In addition, the measuring code and the address code are reflected together in the reflected signal of this apparatus, and when a plurality of sensors of this type coexist, no mechanism for avoiding conflict is provided. Thus, this apparatus can only be utilized for performing telemetry of a sensor existing alone in a communication area, and can not uniquely access each sensor when a plurality of sensors coexist in the area.

The Chinese patent application No. CN201180032851.9 has disclosed a method, which integrates a digital RFID reader with an analog sensor reader, and reduces cost and complexity. The RFID reader reads an address, and an analog impedance monitoring circuit measures a resistance, an inductance or a capacitance at an antenna of sensor. The method may respectively acquire a sensor address and a reflected signal of a sensitive variable at same or different frequencies and at same or different time. However, the method has the following limitations. Firstly, when the analog impedance monitoring circuit works, a plurality of sensors coexisting in a same communication area all reflect analog impedance signals at the same time, which interfere with each other unavoidably and can not be distinguished via the address code. Secondly, only a real part resistance and an imaginary part reactance of a reflected signal impedance can be monitored, and this kind of measurement is influenced by a wavelength periodicity of a wireless signal in a transmission route, which leads to an uncertainty of a phase for the measured complex impedance, thus limiting the monitoring distance, the accuracy and the number of sensitive variables. Therefore, it is only applicable to a near-field coupling application where a relative position between a sensor and a telemeter is fixed rather than an intermediate-remote distance telemetry, and three or less sensors can be externally connected.

SUMMARY OF THE INVENTION

The purpose of the present invention is to provide a sensor, a telemeter, a wireless sensor system and a use method therefor, which can fundamentally avoid conflicts between a plurality of sensors within same communication area, reliably increase sensor capacity within a frequency band and measurement accuracy and speed, and reduce power consumption and expand communication scope, so that sensors can be utilized in near-field coupling and intermediate-remote distance telemetry To solve the above technical problem, one embodiment of the present invention discloses a sensor, which comprises:

a radio frequency identification tag which performs a digital communication with a telemeter and judges if a preset address code matches with a target address code of the telemeter according to a digital communication signal received from the telemeter in a digital communication mode, wherein if not matched, the sensor maintains the digital communication mode, and if matched, the sensor is a target sensor, the radio frequency identification tag of the target sensor turns on a first switch so that the target sensor enters an analog sensing mode, and in the analog sensing mode, the radio frequency identification tag of the target sensor turns off the first switch after an analog sensing module has reflected an analog sensing signal so that the target sensor switches back to the digital communication mode;

the first switch which turns on or turns off an analog communication between the analog sensing module and the telemeter; and the analog sensing module which reflects the analog sensing signal to the telemeter in the analog sensing mode.

Another embodiment of the present invention discloses a telemeter, which comprises:

a second switch which selects an analog transceiver link or a radio frequency to identification front end to communicate with a sensor;

a radio frequency identification front end;

the analog transceiver link which radiates a target sensor with a radio frequency electromagnetic wave, receives an analog sensing signal from the target sensor and transmits the analog sensing signal to a controller in an analog sensing mode; and the controller which controls the second switch to throw to the radio frequency identification front end and controls the radio frequency identification front end to search for the target sensor according to whether a target address code matches with a preset address code of the sensor in a digital communication mode; and the controller controls the second switch to throw to the analog transceiver link after the target sensor has been found so that the telemeter enters the analog sensing mode; and in the analog sensing mode, the controller controls the second switch to throw to the radio frequency identification front end after having received the analog sensing signal of the target sensor so that the telemeter switches back to the digital communication mode.

Another embodiment of the present invention discloses a wireless sensor system, which comprises a telemeter described as above and at least one sensor described as above.

Another embodiment of the present invention discloses a use method of a sensor, wherein the sensor comprises a radio frequency identification tag, a first switch and an analog sensing module, and the first switch turns on or turns off an analog communication between the analog sensing module and a telemeter; and the use method comprises the following steps:

in a digital communication mode, the radio frequency identification tag performs a digital communication with a telemeter and judges if a preset address code matches with a target address code of the telemeter according to a digital communication signal received from the telemeter, wherein if not matched, the sensor maintains the digital communication mode, and if matched, the sensor is a target sensor, and the radio frequency identification tag of the target sensor turns on the first switch so that the target sensor enters an analog sensing mode;

in the analog sensing mode, the analog sensing module reflects an analog sensing signal to the telemeter, and the radio frequency identification tag turns off the first switch after the analog sensing module has reflected the analog sensing signal so that the target sensor switches back to the digital communication mode.

Another embodiment of the present invention discloses a use method of a telemeter, wherein the telemeter comprises a second switch, a radio frequency identification front end, an analog transceiver link and a controller, and the second switch selects the analog transceiver link or the radio frequency identification front end to communicate with a sensor; and the use method comprises the following steps:

the controller controls the second switch to throw to the radio frequency identification front end so that the telemeter enters a digital communication mode;

the controller controls the radio frequency identification front end to search for a target sensor according to whether a target address code matches with a preset address code of the sensor, and the controller controls the second switch to throw to the analog transceiver link after the target sensor has been found so that the telemeter enters an analog sensing mode;

the analog transceiver link radiates the target sensor with a radio frequency electromagnetic wave, receives an analog sensing signal from the target sensor and transmits the analog sensing signal to the controller;

the controller controls the second switch to throw to the radio frequency identification front end after having received the analog sensing signal of the target sensor so that the telemeter switches back to the digital communication mode, and controls the radio frequency identification front end to search for next target sensor.

Comparing with the prior art, the embodiments of the present invention have the following main differences and effects:

The wireless sensor system of the present invention comprises a telemeter and at least one sensor, and the sensor and the telemeter switch between a digital communication mode and an analog sensing mode, wherein the digital communication mode is utilized for searching for and activating a target sensor according to whether a target address code matches with a preset address code, the analog sensing mode is utilized for transmitting an analog sensing signal of the target sensor to extract a sensitive variable to be measured, and other sensors are in a standby state and do not reflect a sensing signal. Utilizing only address codes to perform a chip select of sensors can fundamentally avoid conflicts between a plurality of sensors within same communication area, the telemeter can communicate with respective sensors one by one, and a limited code length can be utilized to provide a great address space, thereby reliably increasing sensor capacity within a frequency band and measurement accuracy and speed. Furthermore, utilizing an analog signal to extract a sensitive variable to be measured avoids utilizing a complex, power consuming digitization and corresponding frame circuit, which reduces power consumption and expands a communication scope, so that sensors can be utilized in near-field coupling and intermediate-remote distance telemetry.

Further, the telemeter performs a direct chip select of a target sensor. If the preset address code of the sensor itself is different from the target address code, the sensor maintains the digital communication mode and keeps silent, and if they are same, the sensor switches to the analog sensing mode and reflects a sensing signal, which helps to reduce the time of traversing all sensors and increase a telemetry frequency.

Further, each sensor may also actively transmit its own preset address code and transmits the preset address code again after a random time delay when having not received an analog sensing command, and a telemeter decides transmitting a digital communication command or an analog sensing command according to whether address codes have a conflict or are matched, and each sensor decides whether to switch a work mode according to whether the sensor has received the analog sensing command and whether the sensor has transmitted the address code lately. When the scale of sensors is small, the telemeter may traverse respective sensors within its communication area one by one via a reasonable time delay algorithm and after a sufficiently long time, which can reduce a complexity of a sensor circuit, and reduce an average transmitting power of the telemeter and interference of adjacent telemeters Further, power is taken from an electromagnetic radiation and detection is performed respectively by configuring a radio frequency rectifier, an energy storage member and a radio frequency passive probe in a sensor, so that the sensor does not need DC power supply, avoids utilizing a complex, power consuming digitization and corresponding frame circuit, also does not need sleeping and waking up, and works passively on the whole. This greatly reduces power consumption and expands a communication scope, thus allowing sensors to be utilized in near-field coupling and intermediate-remote distance telemetry.

Further, a great address space can be provided via a limited code length, and respective address codes can be leveled to further traverse respective analog sensing modules in the sensor, so that a designated analog sensing module can be enabled independently.

Further, a sensitive variable to be measured is extracted by transmitting a radio frequency signal to a sensor and receiving a reflected signal, so that the sensor avoids utilizing a complex, power consuming digitization and corresponding frame circuit, also does not need sleeping and waking up and works passively on the whole. This greatly reduces power consumption and expands a communication scope, thus allowing sensors to be utilized in near-field coupling and intermediate-remote distance telemetry.

DETAILED DESCRIPTION OF THE PREFERRED EMBODIMENTS

In the following description, many technical details are provided for readers to better understand the present application. However, it is understood to those ordinary skilled in the art that the technical solution claimed to be protected by those claims of the present application can also be realized not based on various changes and modifications of the following embodiments and even without these technical details To elucidate the purpose, technical solution and merits of this invention, the following description of the embodiments of this invention is provided in detail with reference to the accompanying drawings.

Figure 1:
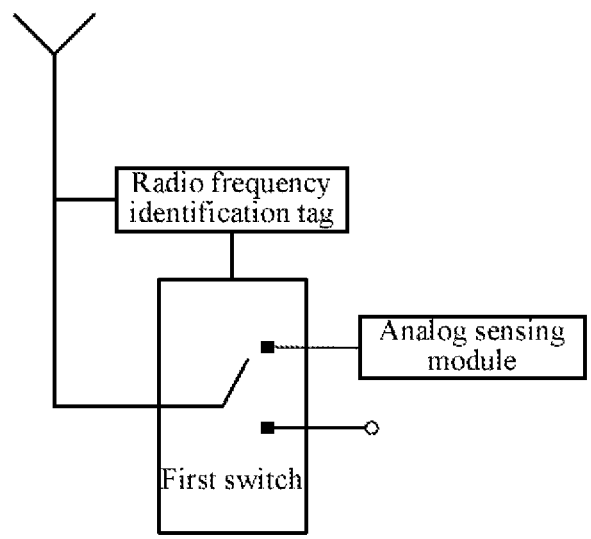
FIG. 1 is a schematic diagram of a sensor according to the first embodiment of the present invention.

The first embodiment of the present invention relates to a sensor, and FIG. 1 is a schematic diagram of the sensor. As shown in FIG. 1, the above sensor comprises a radio frequency identification tag, a first switch and an analog sensing module, wherein:

The radio frequency identification tag performs a digital communication with a telemeter and judges whether a preset address code matches with a target address code of the telemeter according to a digital communication signal received from the telemeter in a digital communication mode; wherein if not matched, the sensor maintains the digital communication mode, and if matched, the sensor is a target sensor, and the radio frequency identification tag of the target sensor turns on the first switch so that the target sensor enters an analog sensing mode; and in the analog sensing mode, the radio frequency identification tag of the target sensor turns off the first switch after the analog sensing module has reflected an analog sensing signal so that the target sensor switches back to the digital communication mode.

It can be understood that, the above radio frequency identification tag does not necessarily turn off the above first switch immediately after the analog sensing signal has been reflected, and may also turn off the above first switch after the sensor has entered the analog sensing mode for a predetermined time which is longer than a transmission time of the analog sensing signal.

Further, it can be understood that, the above digital communication mode and the analog sensing mode can work at a same frequency or at different frequencies. A typical work bandwidth is 1 MHz to 20 MHz.

The above radio frequency identification tag is preset with an address code, and the preset address code is compared with the target address code chosen by the telemeter. If the two address are matched, the sensor is selected and switches to the analog sensing mode to reflect an analog response signal with information of a sensitive variable; when the sensor is within a communication area of the telemeter but not selected, the sensor is in a standby listening state and does not reflect an analog response signal, thus not interfering with a normal communication and telemetry of the selected sensor.

The first switch turns on or turns off an analog communication between the analog sensing module and the telemeter. The first switch shifts the conversion from the digital communication mode to the analog sensing mode.

The analog sensing module reflects the analog sensing signal to the telemeter in the analog sensing mode.

The above sensor performs a time-division switching between the digital communication mode and the analog sensing mode, wherein the digital communication mode is utilized for determining a chip-select address and activating the chosen sensor, and the analog sensing mode is utilized for measuring an analog signal reflected by the analog sensing module and extracting a sensitive variable to be measured.

Two different addressing control mechanisms utilized for the above sensor are proposed in order to apply to applications having different scales. A direct chip-select mechanism is utilized in large-scale applications, while a sensor active reporting mechanism is utilized in small-scale systems. Specifically:

The above sensor may utilize a direct chip select, and the radio frequency identification tag receives the target address code from the telemeter and judges whether the target address code matches with the preset address code in the digital communication mode, and if not matched, the sensor maintains the digital communication mode, otherwise the sensor is a target sensor, and the radio frequency identification tag of the target sensor transmits a response signal to the telemeter and turns on the first switch so that the target sensor enters the analog sensing mode.

The telemeter performs a direct chip select of a target sensor and sends out a chip-select command with the target address code to all sensors within its communication area. A sensor compares its own preset address code with the target address code in the command content. If the preset address code of the sensor itself is different from the target address code, the sensor maintains the digital communication mode and the standby listening state, and if they are same, the sensor responds to the telemeter and switches to the analog sensing mode. Meanwhile the response also causes the telemeter to transform from the digital communication mode to the analog sensing mode, which helps to reduce the time of traversing all sensors and increase telemetry frequency.

Optionally, the above sensor may also utilize an active reporting. The radio frequency identification tag receives a digital communication command from the telemeter and then actively transmits the preset address code to the telemeter in the digital communication mode. The telemeter judges whether the preset address code matched with the target address code has been found, and if there is no match, the radio frequency identification tag transmits the preset address code to the telemeter again after a random time delay and judges whether the telemeter has transmitted an analog sensing command. If there is a match, the telemeter transmits the analog sensing command, meanwhile the radio frequency identification tag judges whether the preset address code has been transmitted within a preset time threshold before receiving the analog sensing command, and if it is, the sensor is a target sensor, and the radio frequency identification tag of the target sensor turns on the first switch so that the target sensor enters the analog sensing mode, otherwise the sensor maintains the digital communication mode.

The telemeter transmits a global work mode command which comprises a digital communication command or an analog sensing command, each sensor actively transmits its own preset address code respectively after entering the communication area of the telemeter and transmits the preset address code again after a random time relay independently set based on the respective last transmitting time when no analog sensing command has been received. The telemeter modifies the global work mode command according to a decision on whether the address codes have a conflict, i.e. switching from transmitting the digital communication command to transmitting the analog sensing command. Each sensor decides whether it should switch its own work mode according to whether the sensor has received the analog sensing command and whether the sensor has transmitted the address code lately. When sensors are of small scale, the telemeter may traverse respective sensors within its communication area one by one via a reasonable time delay algorithm and after a sufficiently long time. This can reduce a complexity of a sensor chip-select circuit, and reduce an average transmitting power of the telemeter and interferences from adjacent telemeters.

Further, it can be understood that, in the other embodiments of the present invention, other communication means can also be utilized to perform addressing control.

As an optional embodiment, the sensor has a plurality of analog sensing modules, and the first switch is a multithrow switch utilized for selecting an analog sensing module which performs an analog communication with the telemeter. Further, it can be understood that, in other embodiments of the present invention, the above first switch can also be several single-throw switches interconnected with each other.

When the sensor has a plurality of analog sensing modules, the radio frequency identification tag presets multilevel address codes which respectively correspond with the sensor and its analog sensing modules, and after it is confirmed that the preset address code matches with the target address code of the telemeter, the radio frequency identification tag is selected. The first switch is controlled to throw to the selected analog sensing module according to a secondary address code so that the target sensor enters the analog sensing mode. Generally, a preset address code has a typical code length of 8 to 256 bits.

A plurality of analog sensing modules on the same sensor can be monitored independently and successively via multilevel address codes, i.e. a specific sensor is selected via a partial code segment in the address code, and the other sensors are in standby listening states. Then certain probe on the selected sensor is performed addressing via the rest code segment in the address code.

A great address space can be provided via a limited code length, and respective address codes can be leveled to further traverse respective analog sensing modules in a sensor, so that a designated analog sensing module can be enabled independently.

Further, it can be understood that, in other embodiments of the present invention, various other combinations such as a code division, a time division or a frequency division and the like can also be utilized to implement a simultaneous monitoring of sensors within respective communication areas by one or more telemeters so as to prevent conflicts. Specifically, a multiple access may further be achieved for a plurality of modules contained in an array of analog sensing modules via a frequency division or a time division means, so that a plurality of modules are simultaneously monitored via the address code of sensor to which they belong; or a plurality of sensors may also be divided into several groups, and each group utilizes a same address code and can be selected together and monitored simultaneously, and respective sensor within a group utilizes a different frequency or a different time slot to prevent conflicts, i.e.

conflicts within a group are avoided via a protocol of frequency division multiple access or a protocol of time division multiple access, and conflicts between different groups can just be avoided only via different address codes, which further improves the system response speed and capacity.

In this way, a plurality of sensors can coexist simultaneously in a communication area of one telemeter, and respective sensors prevent conflicts via address codes or work frequencies or work time slots. Further, a plurality of telemeters may also be comprised, and conflicts are prevented by selecting spaced scopes of communication areas or spaced work frequencies or spaced work time slots.

The sensor of the present embodiment comprises a radio frequency identification tag, a first switch and an analog sensing module, wherein the radio frequency identification tag judges whether a preset address code matches with a target address code of a telemeter according to a digital communication signal received from the telemeter, so as to turn on or turn off the first switch to control an analog communication between the analog sensing module and the telemeter, so that the above sensor is switched between the digital communication mode and the analog sensing mode. Utilizing only address codes to perform a chip select of sensors can fundamentally avoid conflicts between several sensors within same communication area. The telemeter can communicate with respective sensors one by one, and a limited code length can be utilized to provide a great address space, thus reliably increasing sensor capacity within a frequency band and measurement accuracy and speed. Furthermore, utilizing an analog signal to extract a sensitive variable to be measured avoids utilizing a complex, power consuming digitization and corresponding frame circuit, reduces a power consumption and expands a communication scope, so that sensors can be utilized in a near-field coupling and an intermediate-remote distance telemetry.

Figure 2:
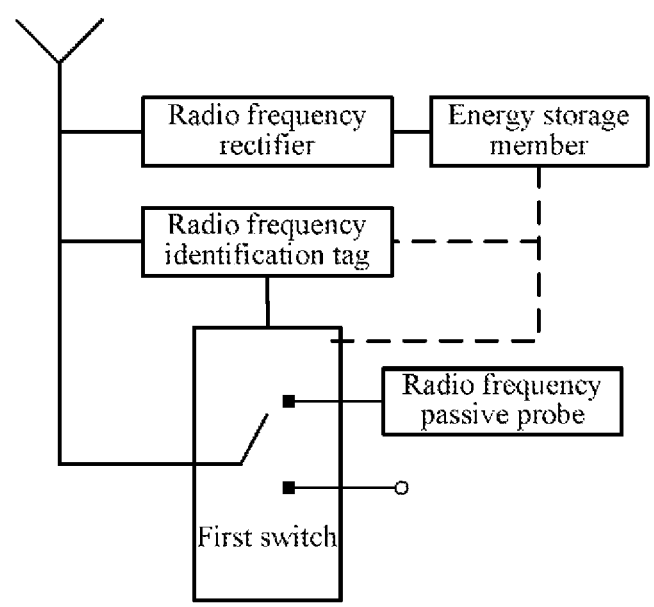
FIG. 2 is a schematic diagram of a sensor according to the second embodiment of the present invention.

The second embodiment of the present invention relates to a sensor, and FIG. 2 is a schematic diagram of the sensor. The second embodiment is improved based on the first embodiment, and the main improvement is as follows: a power is taken from an electromagnetic radiation and a detection is performed respectively by configuring a radio frequency rectifier, an energy storage member and an radio frequency passive probe in a to sensor, so that the sensor does not need a DC power supply, avoids utilizing a complex, power consuming digitization and corresponding frame circuit, and also does not need sleeping and waking up, and works passively on the whole. This greatly reduces a power consumption and expands a communication scope, allowing sensors to be utilized in a near-field coupling and an intermediate-remote distance telemetry. Specifically:

As shown in FIG. 2, the above sensor further comprises a radio frequency rectifier and an energy storage member.

The radio frequency rectifier transforms a radio frequency electromagnetic radiation received from the telemeter into a direct current so as to charge the energy storage member.

The energy storage member supplies power to the radio frequency identification tag and the first switch.

In the present embodiment, preferably, the radio frequency rectifier, the radio frequency identification tag and the first switch are integrated and packaged to form a multi-port chip. Of course, it can be understood that, in other embodiments of the present invention, the radio frequency rectifier, the radio frequency identification tag and the first switch can also be separately packaged as a discrete component.

As an optional embodiment, the analog sensing module is a radio frequency passive probe which receives a radio frequency signal from the telemeter and transmits a reflected signal to the telemeter in the analog sensing mode. In the analog sensing mode, the telemeter excites an electromagnetic resonance or transmission within the radio frequency passive probe in the sensor by a radio frequency continuous wave, and monitors the signal feature of radio frequency reflected from the above probe or an arithmetic value of a plurality of signal features so as to solve the corresponding sensitive variable to be measured.

The above radio frequency identification tag turns off the first switch to switch the target sensor back to the digital communication mode after the radio frequency passive probe has transmitted the reflected signal.

Preferably, the radio frequency passive probe is an oscillator or a transmission line type analog radio frequency passive probe. An array of radio frequency passive probes includes one or more parallel oscillators or transmission line type analog radio frequency passive probes, which modulate a radio frequency signal based on its environmental sensitive variable and do not need a DC power supply. It can be understood that, a radio frequency passive probe can be utilized for measuring sensitive variables such as temperature, pressure, humidity, or vibration etc. Optionally, the above array of radio frequency passive probes includes at least two radio frequency passive probes which are respectively utilized for measuring sensitive variables such as temperature, pressure, humidity, or vibration etc., and the reflected signal features may include signal amplitude, frequency, phase, power, time delay etc.

Further, it can be understood that, in other embodiments of the present invention, the above sensor may also utilize other DC or AC power supply circuit, and the analog sensing module may also utilize an analog sensing device which needs a power supply, without affecting implementation of the technical solution of the present invention.

A combination of the above respective improvements form a preferred embodiment of the present invention, but the respective improvements may also be utilized separately.

Figure 3:
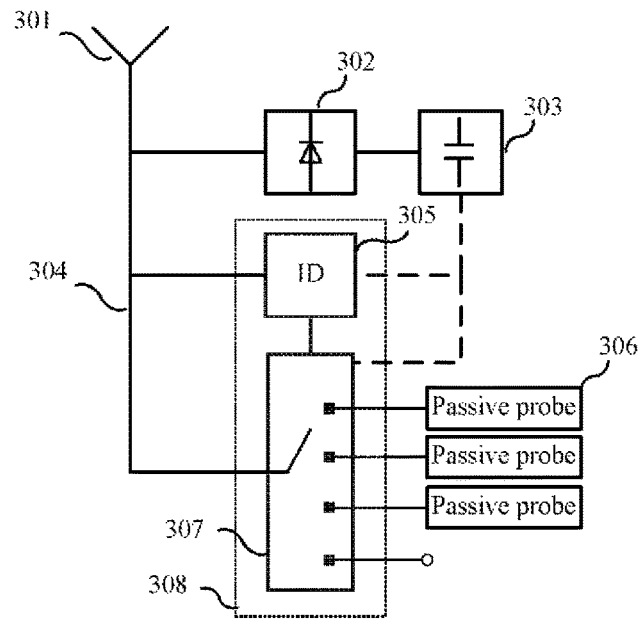
FIG. 3 is a schematic diagram of a sensor according to the second embodiment of the present invention.

As a preferred example of the present invention, a multiple access passive wireless digital-analog hybrid sensor structure as shown in FIG. 3 comprises: an integrated small antenna 301, a radio frequency rectifier 302, an energy storage member 303, a power distribution network 304, an array of passive radio frequency sensor probes 306 (corresponding to the analog sensing module) and a radio frequency code division multiple access chip select circuit 308. The radio frequency code division multiple access chip select circuit 308 is comprised of a radio frequency identification tag 305 and a digital-analog mode switch (i.e. the first switch) 307, and the radio frequency identification tag 305 contains a preset address code (ID).

When implemented, the antenna 301 is a miniaturized integrated antenna, which is a meander line dipole antenna, a microstrip patch antenna, an inverted F antenna or a slot antenna in the present example. Its radio frequency ground is connected to a ground potential of the sensor, meanwhile a feeding efficiency is improved through an optional impedance matching network. An integrated antenna is utilized for transferring or feeding back communication and sensing signals, and is utilized for capturing a radio frequency electromagnetic radiation from a telemeter so as to wirelessly supply power to the radio frequency code division multiple access chip select circuit 308.

The power distribution network 304 is connected to an antenna port, which can use a microstrip line connection or a bonding wire connection. The length and diameter or width of the microstrip line or the bonding wire of the power distribution network 304 can be selected according to requirements.

The radio frequency code division multiple access chip select circuit 308 is comprised of a radio frequency identification tag 305 and a digital-analog mode switch (i.e. the first switch) 307. A direct current is recovered by the radio frequency rectifier 302 from the radio frequency electromagnetic radiation captured by antenna 301, and charges the energy storage member 303. Preferably, the energy storage member 303 is a capacitor or a micro battery, reaches a rated work voltage after being charged, supplies power to the radio frequency identification tag 305 and the digital-analog mode switch 307, and maintains a power supply in an interval of turning off the radio frequency signal. The preset address code of the radio frequency identification tag 305 has a typical code length of 8 to 256 bits. Preferably, the radio frequency rectifier 302, the digital-analog mode switch 307 and the radio frequency identification tag 305 can be integrated in a single integrated package to constitute a multi-port chip. It can be understood that, in other embodiments of the present invention, the radio frequency rectifier 302, the digital-analog mode switch 307 and the radio frequency identification tag 305 can also be separately packaged as a discrete component.

In one embodiment, the radio frequency identification tag 305 analyzes the target address code of the telemeter obtained from an air interface, and compares the received target address code chosen by the telemeter through a built-in convolutor or comparator. When the address is matched, the radio frequency identification tag 305 controls a reflected signal at the antenna 301 through a built-in key control amplitude or frequency modulation device, adjusts the digital-analog mode switch 307 from an off state into a passive radio frequency sensor probe to reflect an analog sensing signal. If the sensor is within a communication area of the telemeter but not selected and activated, the sensor is in a standby listening state, maintains the digital-analog mode switch 307 in an off state and does not respond to the telemeter.

In another embodiment, the radio frequency identification tag 305 actively transmits the preset address code after being powered on. If the radio frequency identification tag 305 has received a mode switching command from the telemeter within a predetermined time delay, the radio frequency identification tag 305 controls the digital-analog mode switch 307 from off state to a passive radio frequency sensor probe. If the radio frequency identification tag 305 has not received a switching command, the radio frequency identification tag 305 automatically and randomly generates a time delay value, enters a standby listening state, maintains the digital-analog mode switch 307 in an off state, does not respond to the telemeter, and attempts to transmit the preset address code again until a random time delay has been completed.

The array of passive radio frequency sensor probes 306 comprises a plurality of parallel passive radio frequency probes utilized for measuring sensitive variables. Each probe modulates or switches a radio frequency signal based on its environment sensitive variable and does not need a DC power supply. When the digital communication mode transforms to the analog sensing mode, the digital-analog mode switch 307 or a plurality of single-throw switches interconnected with each other is adjusted from an off state to a specific analog radio frequency passive probe which is selected and is connected to the power distribution network 304. At this time, a radio frequency continuous wave of the telemeter is captured by the antenna 301, and most of the radio frequency signal is sent to the passive probe because inputs of the radio frequency rectifier 302 and the radio frequency identification tag 305 are both in a high impedance state in the analog sensing mode. The probe is an oscillator or a transmission line type passive radio frequency device, which utilizes a change of a sensitive variable directly received to modulate a radio frequency signal. The modulated radio frequency signal is reversely propagated to the antenna 301 after a time delay or without a time delay, and is reflected to the telemeter. The probe does not need a DC power supply, avoids utilizing an analog-digital conversion and corresponding frame circuit, and also does not need sleeping and waking up.

Preferably, a sensitive variable of a passive radio frequency probe includes an environment parameter such as temperature, pressure, humidity, or vibration etc. Various features of the modulated radio frequency signal include amplitude, frequency, phase, power, time delay etc.

Preferably, the passive radio frequency probe may be a surface acoustic wave sensor, a ferroelectric oscillator, a body wave piezoelectric oscillator etc. or a combination thereof.

Preferably, the sensor may further preset a plurality of addresses or multilevel addresses which respectively correspond with the sensor itself and a plurality of cascaded analog radio frequency passive probes, so as to independently enable a designated probe.

Coexistence of a plurality of passive sensors and independent telemetry of various sensitive variables can be implemented by integrating a multiple access chip select function in a passive wireless sensor.

Furthermore, the sensor works passively. The digital radio frequency code division multiple access chip select circuit utilized for determining a selected state and the multithrow switch utilized for switching a work mode are provided with a DC power supply to using a power which is recovered from an electromagnetic wave radiation of the telemeter by the radio frequency rectifier and the energy storage member. And the array of analog radio frequency passive probes includes a plurality of parallel passive radio frequency oscillators or transmission line type probes utilized for measuring sensitive variables. It utilizes a sensitive variable to directly modulate a radio frequency signal, does not need a DC power supply, avoids utilizing an analog-digital conversion and also does not need sleeping and waking up. Therefore, the sensor works passively on the whole.

Figure 4:
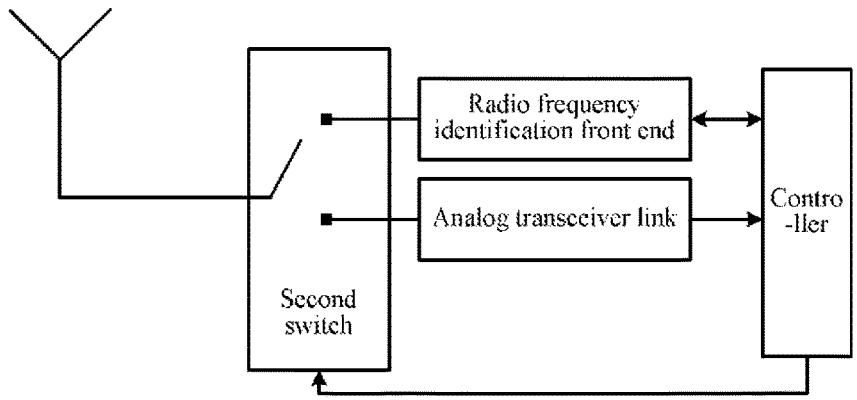
FIG. 4 is a schematic diagram of a telemeter according to the third embodiment of the present invention.

The third embodiment of the present invention relates to a telemeter, and FIG. 4 is a schematic diagram of the telemeter. As shown in FIG. 4, the telemeter comprises:

a second switch that selects an analog transceiver link or a radio frequency identification front end to communicate with a sensor;

a radio frequency identification front end;

an analog transceiver link that radiates a target sensor with a radio frequency electromagnetic wave, receives an analog sensing signal from the target sensor and transmits the analog sensing signal to a controller in an analog sensing mode (it can be understood that, in other embodiments of the present invention, the analog transceiver link may not radiate the target sensor with the radio frequency electromagnetic wave and only receives the analog sensing signal from the target sensor);

a controller that controls the second switch to throw to the radio frequency identification front end and controls the radio frequency identification front end to search for the target sensor according to whether a target address code matches with a preset address code of the sensor in a digital communication mode; the controller controls the second switch to throw to the analog transceiver link after the target sensor has been found so that the telemeter enters the analog sensing mode; and in the analog sensing mode, the controller controls the second switch to throw to the radio frequency identification front end after having received the analog sensing signal of the target sensor so that the telemeter switches back to the digital communication mode.

It can be understood that, the telemeter does not necessarily switch back to the digital communication mode immediately after having received the analog sensing signal, and may also switch back to the digital communication mode after having entered the analog sensing mode for a predetermined time which is longer than a transmission time of the analog sensing signal.

Further, it can be understood that, the above digital communication mode and the analog sensing mode can work at a same frequency or at different frequencies. A typical work bandwidth is 1 MHz to 20 MHz.

The above telemeter performs a time-division switching between the digital communication mode and the analog sensing mode, wherein the digital communication mode is utilized for determining a chip-select address and activating the chosen sensor, and the analog sensing mode is utilized for measuring an analog signal reflected by an analog sensing module of the sensor and extracting a sensitive variable to be measured.

In order to apply to applications having different scales, the telemeter also correspondingly utilizes a direct chip-select mechanism or an active reporting mechanism which correspond with the two different addressing control mechanisms of the sensor.

In the direct chip-select mechanism, the telemeter performs a direct chip select of a target sensor and sends out a chip select command with a target address code to all sensors within its communication area, and a sensor compares its own preset address code with the target address code in the command content. If the preset address code of the sensor itself is different from the target address code, the sensor maintains a digital communication mode, i.e. the sensor maintains a standby listening state, and if they are same, the sensor responds to the telemeter and switches to the analog sensing mode, meanwhile the response also causes the telemeter to transform from the digital communication mode to the analog sensing mode. Thus, it helps to reduce the time of traversing all sensors and to increase a telemetry frequency.

Specifically, the controller controls the radio frequency identification front end to transmit the target address code to a sensor and controls the second switch to throw to the analog transceiver link after having received a response signal from the target sensor whose preset address code matches with the target address code in the digital communication mode, so that the telemeter enters the analog sensing mode.

The radio frequency identification front end receives the response signal from the target sensor and transmits the response signal to the controller.

In the active reporting mechanism, the telemeter transmits a global work mode command which comprises a digital communication command or an analog sensing command, and each sensor actively transmits its own preset address code respectively after entering the communication area of the telemeter and transmits the preset address code again after a random time relay independently set based on the respective last transmitting time when no analog sensing command has been received. The telemeter modifies the global work mode command according to a decision on whether the address codes have a conflict, i.e. switching from transmitting the digital communication command to transmitting the analog sensing command, and each sensor decides whether it should switch its own work mode according to whether the sensor has received the analog sensing command and whether the sensor has transmitted the address code lately. When sensors have a small scale, the telemeter may traverse respective sensors within its communication area one by one via a reasonable time delay algorithm and after a sufficiently long time. This can reduce a complexity of a sensor chip select circuit, and reduce an average transmitting power of the telemeter and interferences from adjacent telemeters.

Specifically, the controller controls the radio frequency identification front end to transmit a digital communication command to a communication area in the digital communication mode, the controller judges whether a preset address code received from a sensor by the radio frequency identification front end matches with the target address code. If not matched, the controller continues controlling the radio frequency identification front end to transmit the digital communication command to the communication area, and continues judging whether a preset address code received by the radio frequency identification front end matches with the target address code. If matched, the controller controls the radio frequency identification front end to transmit an analog sensing command to the communication area, and controls the second switch to throw to the analog transceiver link so that the telemeter enters the analog sensing mode.

The radio frequency identification front end receives a preset address code from a sensor.

Further, it can be understood that, in other embodiments of the present invention, other communication means can also be utilized to perform addressing control.

The telemeter of this embodiment comprises a radio frequency identification front end, a second switch, an analog transceiver link and a controller, wherein the controller controls the radio frequency identification front end to search for the target sensor according to whether a target address code matches with a preset address code of the sensor, and throws the second switch to the analog transceiver link after the target sensor has been found so as to perform an analog communication with the target sensor, so that the above telemeter is switched between the digital communication mode and the analog sensing mode. Utilizing only address codes to perform a chip select of sensors can fundamentally avoid conflicts between a plurality of sensors within same communication area, the telemeter can communicate with respective sensors one by one, and a limited code length can be utilized to provide a great address space, thus reliably increasing a sensor capacity within a frequency band and a measurement accuracy and speed. Furthermore, utilizing an analog signal to extract a sensitive variable to be measured avoids utilizing a complex, power consuming digitization and corresponding frame circuit. It reduces a power consumption and expands a communication scope, so that sensors can be utilized in a near-field coupling and an intermediate-remote distance measurement.

Figure 5:
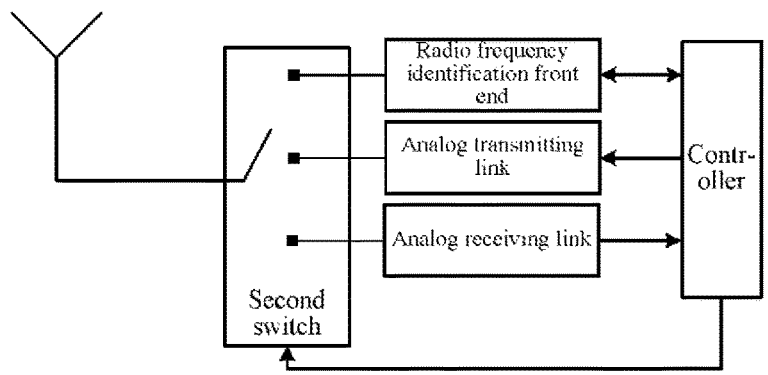
FIG. 5 is a schematic diagram of a telemeter according to the fourth embodiment of the present invention.

The fourth embodiment of the present invention relates to a telemeter, and FIG. 5 is a schematic diagram of the telemeter. The fourth embodiment is improved based on the third embodiment, and the main improvement is as follows: a sensitive variable to be measured is extracted by transmitting a radio frequency signal to a sensor and receiving a reflected signal, so that the sensor avoids utilizing a complex, power consuming digitization and corresponding frame circuit, also does not need sleeping and waking up and works passively on the whole. This greatly reduces a power consumption and expands a communication scope, allowing sensors to be utilized in a near-field coupling and an intermediate-remote distance measurement. Specifically:

As shown in FIG. 5, the analog transceiver link comprises an analog receiving link and an analog transmitting link, and the second switch further selects the analog receiving link and the analog transmitting link to communicate with a sensor.

The analog receiving link receives a reflected signal from the target sensor and transmits the reflected signal to the controller in the analog sensing mode.

In the digital communication mode, the controller further controls the second switch to throw to the analog transmitting link after having found the target sensor so that the telemeter enters the analog sensing mode. In the analog sensing mode, the controller controls the analog transmitting link to transmit a radio frequency signal to the target sensor, controls the second switch to throw to the analog receiving link and controls the second switch to throw to the radio frequency identification front end after having received the reflected signal of the target sensor so that the telemeter switches back to the digital communication mode.

Preferably, the controller further controls the radio frequency identification front end to emit a radio frequency electromagnetic radiation to the communication area so as to charge a sensor. A radio frequency rectifier of the sensor performs a rectification and outputs a direct current from the radiated electromagnetic wave of the telemeter, so as to charge an energy storage member, which keeps supplying a power to a radio frequency identification tag and a first switch when a work mode of the sensor is switched.

A combination of the above respective improvements forms a preferred embodiment of the present invention, but respective improvements may also be utilized separately.

Figure 6:
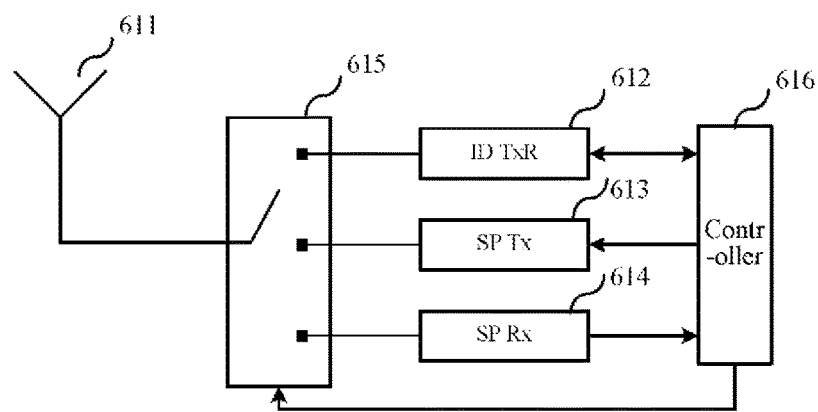
FIG. 6 is a schematic diagram of a telemeter according to the fourth embodiment of the present invention.

As a preferred example of the present invention, a telemeter structure as shown in FIG. 6 comprises: a high-gain antenna 611, a digital-analog channel switch (i.e. the second switch) 615, a digital radio frequency code identification front end (ID TxR) 612 (i.e. the radio frequency identification front end), an analog radio frequency signal transmitting link (SP Tx) 613 (i.e. the analog transmitting link) and a receiving link (SP Rx) 614 (i.e. the analog receiving link), and a controller 616. The telemeter may perform a time-division switching between the digital communication mode and the analog sensing mode. In the digital communication mode, the telemeter activates a required single sensor according to an address code. In the analog sensing mode, the telemeter excites the sensor with a radio frequency continuous wave and monitors a reflected analog signal feature of the sensor to solve a sensitive variable to be measured.

When implemented, the high-gain antenna 611 carries out an electromagnetic radiation of sensors within a communication area, a signaling communication with each sensor and a sensing telemetry of the selected sensor. The digital-analog channel switch 615 shifts among respective terminals of the digital radio frequency code identification front end 612, the analog radio frequency signal transmitting link 613 and the receiving link 614 so as to uniquely connect to the high-gain antenna 611.

In a digital communication mode, the digital radio frequency code identification front end 612 first utilizes an electromagnetic radiation to wirelessly supply a power to a radio frequency code division multiple access chip select circuit 308 of a sensor, and chooses an address code of a target sensor according to a command of the controller 616. Preferably, the digital radio frequency code identification front end 612 transmits a target address code to a sensor, and waits for a response digital signal of the corresponding sensor. Or preferably, the digital radio frequency code identification front end 612 listens to an address code broadcast on an air interface from a sensor within the communication area, determines whether there is a conflict and whether it is the target address code, and then transmits a global mode control command (comprising a digital communication command or an analog sensing command), so as to cause the sensor enter the analog sensing mode when there is no conflict and the target address code has appeared. In the analog sensing mode, the digital radio frequency code identification front end 612 stops work.

When the system enters the analog sensing mode, the digital-analog channel switch 615 throws to the analog radio frequency signal transmitting link 613. The analog radio frequency signal transmitting link 613 radiates a sensor with a preset frequency, bandwidth and power under a command of the controller 616. Preferably, the analog radio frequency signal transmitting link 613 is turned off after a predetermined time, or maintained in a transmitting state. Then the digital-analog channel switch 615 throws to the analog radio frequency signal receiving link 614. This link listens to a reflected signal of the sensor with a designated frequency and bandwidth from the air interface, and extracts a time domain or frequency signal feature after it is digitalized. Preferably, the signal features include amplitude, frequency, phase, power, time delay etc. The data is received by the controller 616, and the corresponding sensitive variable to be measured is solved according to respective signal feature or an arithmetic value of a plurality of signal features. Preferably, the arithmetic value such as a difference or a time domain and frequency domain differential of the signal features can be utilized.

Figure 7:
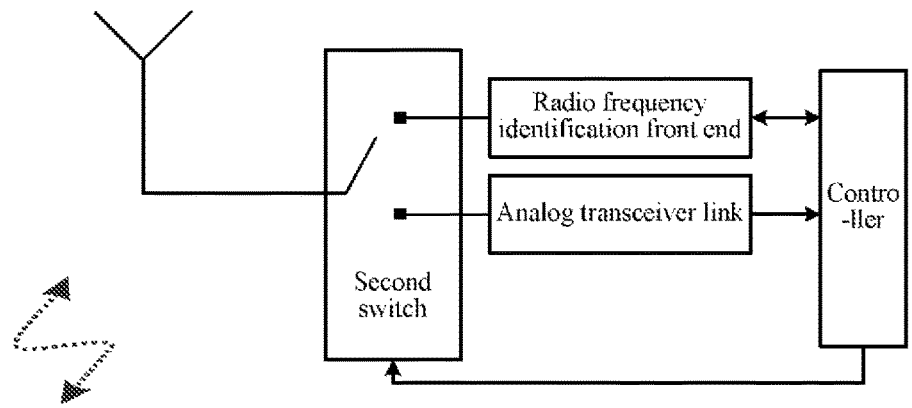
FIG. 7 is a schematic diagram of a wireless sensor system according to the fifth embodiment of the present invention.
Figure 7:
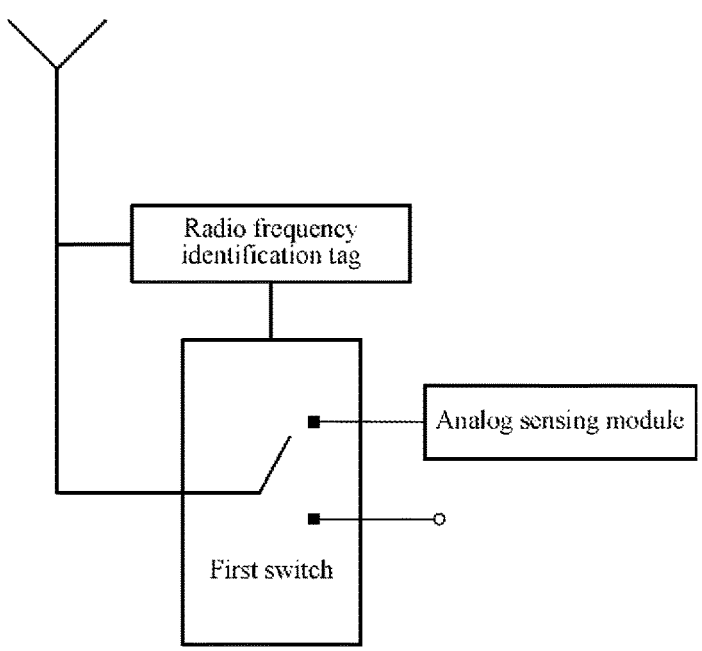

The fifth embodiment of the present invention relates to a wireless sensor system, and FIG. 7 is a schematic diagram of the wireless sensor system. The wireless sensor system comprises a telemeter as described in the third or the fourth embodiment and at least one sensor as described in the first or second embodiment.

Preferably, the wireless sensor system further comprises a data center.

The telemeter further transmits the sensitive variable extracted from the analog sensing signal of the target sensor and the corresponding target address code to the data center.

The data center transmits a boot command to the telemeter via a data bus, and receives, stores and forwards the sensitive variable and the target address code transmitted by the telemeter.

Figure 8:
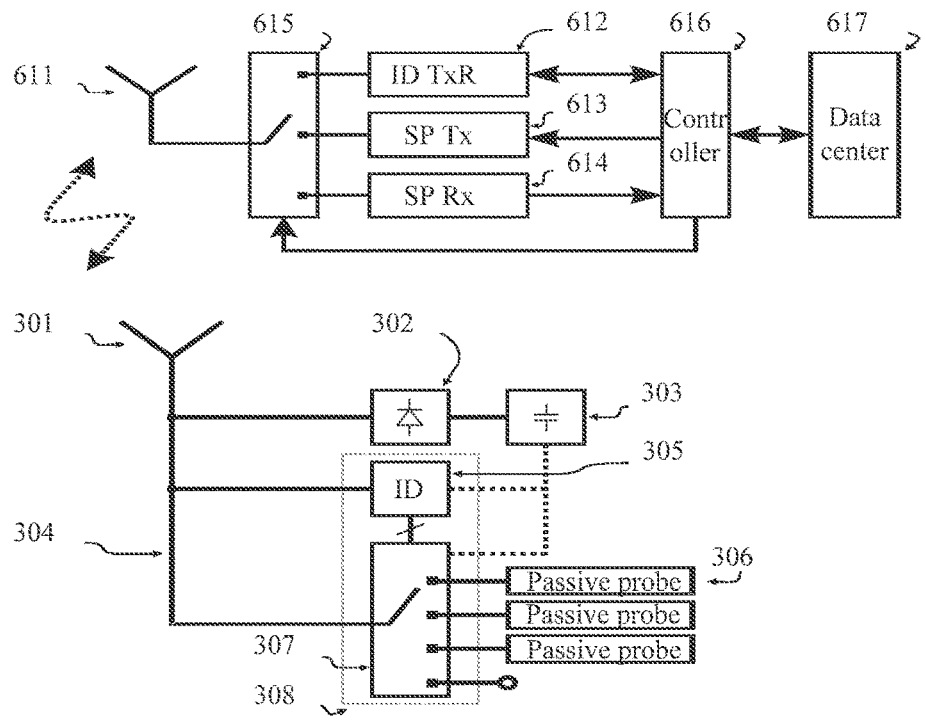
FIG. 8 is a schematic diagram of a multiple access passive wireless sensor system having a chip select function according to the fifth embodiment of the present invention.

As a preferred example of the present invention, the structure of a multiple access passive wireless digital-analog hybrid sensor system having a chip select function is shown in FIG. 8. The system comprises a digital-analog hybrid sensor and a non-contact telemeter. The sensor comprises an integrated small antenna 301, a radio frequency rectifier 302, an energy storage member 303, a power distribution network 304, an array of analog radio frequency passive probes 306 and a digital radio frequency code division multiple access chip select circuit 308. The telemeter comprises a high-gain antenna 611, a digital-analog channel switch (i.e. the second switch) 615, a digital radio frequency code identification front end 612, an analog radio frequency signal transceiver 613 614, a controller 616 and a background data center 617.

The wireless sensor system is a hybrid sensor system which utilizes a multiple access switch to switch between a digital communication work mode and an analog sensing work mode. The system comprises a sensor and a telemeter which have a hybrid mode. In the digital communication mode, the radio frequency code division multiple access chip select circuit of the sensor determines a chip select state and decides whether to switch a work mode; in the analog sensing mode, the array of analog radio frequency passive probes of the sensor utilizes a sensitive variable to directly modulate a reflected radio frequency signal. The telemeter utilizes the digital radio frequency code identification front end to transmit and receive a communication signaling and control a work state of each sensor within a communication area in the digital communication mode, and utilizes the analog radio frequency signal transceiver to radiate the selected sensor and listen to a reflected signal feature or an arithmetic value of a plurality of features to solve a sensitive variable to be measured in the analog sensing mode wherein the arithmetic value includes, e.g., a difference, a differential etc.

The system performs a time-division switching between the digital communication mode and the analog sensing mode. In the digital communication mode, via a signaling protocol of a telemeter direct chip select or a sensor active reporting etc., a required single sensor is activated according to an address code. Then, the telemeter and the sensor are both switched to the analog sensing mode. The telemeter excites an electromagnetic resonance or transmission in an analog radio frequency passive probe of the sensor, the probe directly modulates a reflected signal, and the telemeter monitors analog signal features such as amplitude, frequency, phase, power, time delay and the like of the reflected signal to solve the corresponding sensitive variable to be measured. Then each sensitive variable corresponding to the sensor address extracted by the controller 616 in the telemeter is received, stored or forwarded by the background data center 617, facilitating a background expert system or a human machine interface to make decision. The system is useful in a near-field coupling and an intermediate-remote distance telemetry, allows a plurality of sensors to coexist within a communication area without interference with each other, and may communicate with respective sensors one by one, thus reliably increasing sensor capacity within a frequency band and measurement accuracy and speed. The utilized analog radio frequency passive probe does not need a DC power supply, has no standby and waking up process, and also avoids utilizing a complex, power consuming digitization and corresponding frame circuit.

It should be appreciated that, the above example is only a preferred embodiment of the present invention, and in other embodiments of the present, a telemeter and a sensor of different configurations may also be combined according to actual situations, so as to form a wireless sensor system meeting practical requirements.

The wireless sensor system of the present embodiment comprises a telemeter and at least one sensor, wherein the sensor and the telemeter switch between a digital communication mode and an analog sensing mode respectively through a radio frequency identification tag, a first switch and a radio frequency identification front end, and a second switch; the digital communication mode is utilized for searching for and activating a target sensor according to whether a target address code matches with a preset address code, the analog sensing mode is utilized for transmitting an analog sensing signal of the target sensor to extract a sensitive variable to be measured, and other sensors are in a standby state and do not reflect a sensing signal. Utilizing only different address codes can fundamentally avoid conflicts between several sensors within same communication area, the telemeter can communicate with respective sensors one by one, and a limited code length can be utilized to provide a great address space, thus reliably increasing sensor capacity within a frequency band and measurement accuracy and speed. Furthermore, utilizing an analog signal to extract a sensitive variable to be measured avoids utilizing a complex, power consuming digitization and corresponding frame circuit and reduces a power consumption and expands a communication scope so that sensors can be utilized in a near-field coupling and an intermediate-remote distance measurement.

Figure 9:
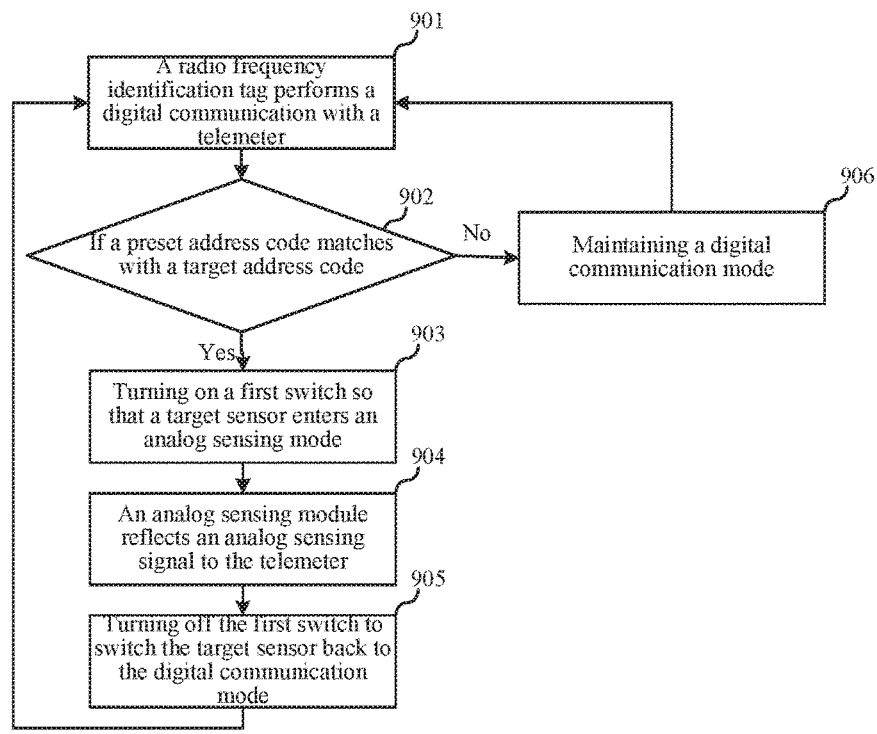
FIG. 9 is a flow chart for a use method of a sensor according to the sixth embodiment of the present invention.

The sixth embodiment of the present invention relates to a method of using sensor. FIG. 9 is a flowchart of the method of using sensor.

The sensor comprises a radio frequency identification tag, a first switch and an analog sensing module, and the first switch turns on or turns off an analog communication between the analog sensing module and the telemeter. As shown in FIG. 9, the use method of sensor comprises the following steps:

In step 901, the sensor works in a digital communication mode, and the radio frequency identification tag performs a digital communication with a telemeter.

Then in step 902, the radio frequency identification tag judges whether a preset address code matches with a target address code of the telemeter according to a digital communication signal received from the telemeter; if not matched, then it proceeds to step 906, and if matched, the sensor is a target sensor and then it proceeds to step 903.

In step 903, the radio frequency identification tag of the target sensor turns on the first switch so that the target sensor enters an analog sensing mode;

Then it proceeds to step 904, the sensor works in the analog sensing mode, and the analog sensing module reflects an analog sensing signal to the telemeter.

Then it proceeds to step 905, the radio frequency identification tag turns off the first switch after the analog sensing module has reflected the analog sensing signal so that the target sensor switches back to the digital communication mode.

It can be understood that, the above radio frequency identification tag does not necessarily turn off the above first switch immediately after the analog sensing signal has been reflected, and may also turn off the above first switch after the sensor has entered the analog sensing mode for a predetermined time which is longer than a transmission time of the analog sensing signal.

Then it proceeds to next round of communication.

In step 906, the sensor maintains the digital communication mode and is in a standby listening state.

The sensor is in the digital communication mode in steps 901, 902, 903 and 906, and the sensor is in the analog sensing mode in steps 904 and 905.

Further, it can be understood that, the above digital communication mode and the analog sensing mode can work at a same frequency or at different frequencies. A typical work bandwidth is 1 MHz to 20 MHz.

Two different addressing control mechanisms are proposed in order to apply to applications in different scales. A direct chip-select mechanism is utilized in large-scale applications, while a sensor active reporting mechanism is utilized in small-scale systems. Specifically:

In the digital communication mode, the use method of sensor may comprise the following steps:

the radio frequency identification tag receives the target address code from the telemeter;

the radio frequency identification tag judges whether the target address code matches with the preset address code, and if not matched, the sensor maintains the digital communication mode, otherwise the sensor is a target sensor, and the radio frequency identification tag of the target sensor transmits a response signal to the telemeter and turns on the first switch so that the target sensor enters the analog sensing mode.

The telemeter performs a direct chip select of a target sensor. If the preset address code of the sensor itself is different from the target address code, the sensor maintains the digital communication mode and keeps silent, and if they are same, the sensor switches to the analog sensing mode and reflects a sensing signal. This helps to reduce the time of traversing all sensors and increase a telemetry frequency.

Optionally, in the digital communication mode, the use method of sensor may further comprise the following steps:

the radio frequency identification tag receives a digital communication command from the telemeter;

the radio frequency identification tag actively transmits the preset address code to the telemeter after having received the digital communication command;

the telemeter judges whether the preset address code matched with the target address code has been found, wherein if there is no match, the radio frequency identification tag transmits the preset address code to the telemeter again after a random time delay and judges whether the telemeter has transmitted an analog sensing command; and if there is a match, the telemeter transmits the analog sensing command; meanwhile the radio frequency identification tag judges whether the preset address code has been transmitted within a preset time threshold before receiving the analog sensing command, and if it is, the sensor is a target sensor and the radio frequency identification tag of the target sensor turns on the first switch so that the target sensor enters the analog sensing mode, otherwise the sensor maintains the digital communication mode.

Each sensor actively transmits its own preset address code and transmits the preset address code again after a random time delay when it does not receive a sensing command. The telemeter decides on transmitting the digital communication command or the analog sensing command according to whether the address codes have a conflict or whether the address codes are matched, and each sensor decides whether it should switch its own work mode according to whether the sensor has received the analog sensing command and whether the sensor has transmitted the address code lately. When sensors have a small scale, the telemeter may traverse respective sensors within its communication area one by one via a reasonable time delay algorithm and after a sufficiently long time. This can reduce a complexity of a sensor circuit, and reduce an average transmitting power of the telemeter and interferences of adjacent telemeters.

Further, it can be understood that, in other embodiments of the present invention, other communication means can also be utilized to perform an addressing control.

As a preferred embodiment, the sensor has a plurality of analog sensing modules, and the first switch is a multithrow switch utilized for selecting an analog sensing module which performs an analog communication with the telemeter. Further, it can be understood that, in other embodiments of the present invention, the above first switch can also be several single-throw switches interconnected with each other.

When the sensor has a plurality of analog sensing modules, the radio frequency identification tag presets multilevel address codes which respectively correspond with the sensor and its analog sensing modules. In the digital communication mode, after the radio frequency identification tag has confirmed that the preset address code matches with the target address code of the telemeter, the radio frequency identification tag controls the first switch to throw to the selected analog sensing module so that the target sensor enters the analog sensing mode. Generally, a preset address code has a typical code length of 8 to 256 bits.

A great address space can be provided via a limited code length, and respective address codes can be leveled to further traverse respective analog sensing modules in the sensor, so that a designated analog sensing module can be enabled independently.

Further, it can be understood that, in the other embodiments of the present invention, various other combinations such as a code division, a time division or a frequency division and so on can also be utilized to implement a simultaneous monitoring of sensors by one or more telemeters in their respective communication areas and to prevent conflicts.

In the present embodiment, the radio frequency identification tag of the sensor judges whether a preset address code matches with a target address code of a telemeter according to a digital communication signal received from the telemeter so as to turn on or turn off the first switch to control an analog communication between the analog sensing module and the telemeter. Therefore, the above sensor is switched between the digital communication mode and the analog sensing mode. Utilizing only address codes to perform a chip select of sensors can avoid fundamentally conflicts between a plurality of sensors in same communication area, the telemeter can communicate with respective sensors one by one, and a limited code length can be utilized to provide a great address space, thus reliably increasing sensor capacity within a frequency band and measurement accuracy and speed. Furthermore, utilizing an analog signal to extract a sensitive variable to be measured avoids utilizing a complex, power consuming digitization and corresponding frame circuit. This reduces a power consumption and expands a communication scope, so that sensors can be utilized in a near-field coupling and an intermediate-remote distance measurement.

This embodiment is the method embodiment corresponding to the first embodiment, and this embodiment and the first embodiment can be implemented in cooperation with each other. The correlated technical details disclosed in the first embodiment are still effective in this embodiment and will not be repeated here in order to reduce redundancy. Correspondingly, the correlated technical details disclosed in this embodiment can also be applied in the first embodiment.

The seventh embodiment of the present invention relates to a use method of sensor. The seventh embodiment is improved based on the sixth embodiment, and the main improvement is as follows: the sensor utilizes a radio frequency rectifier, an energy storage member and a radio frequency passive probe to take a power from an electromagnetic radiation and to perform detection respectively, so that the sensor does not need a DC power supply, avoids utilizing a complex, power consuming digitization and corresponding frame circuit, also does not need sleeping and waking up and works passively on the whole. This greatly reduces a power consumption and expands a communication scope, and allows sensors to be utilized in a near-field coupling and an intermediate-remote distance telemetry. Specifically:

The sensor further comprises a radio frequency rectifier and an energy storage member. The use method of sensor further comprises the following steps:

the radio frequency rectifier receives a radio frequency electromagnetic radiation from the telemeter, transforms the radio frequency electromagnetic radiation to a direct current and charges the energy storage member, and the energy storage member supplies power to the radio frequency identification tag and the first switch.

In this embodiment, preferably, the radio frequency rectifier, the radio frequency identification tag and the first switch can be integrated and packaged to form a multi-port chip. Of course, it can be understood that, in other embodiments of the present invention, the radio frequency rectifier, the radio frequency identification tag and the first switch can also be separately packaged as a discrete component.

Further, it can be understood that, the sensor may be charged once the telemeter has been started, may also be charged when it communicates with the telemeter, and may also be charged after it has communicated with the telemeter.

As an optional embodiment, the analog sensing module is a radio frequency passive probe. In the analog sensing mode, the use method of sensor comprises the following steps:

the radio frequency passive probe receives a radio frequency signal from the telemeter and transmits a reflected signal to the telemeter;

the radio frequency identification tag turns off the first switch to switch the target sensor back to the digital communication mode after the radio frequency passive probe has transmitted the reflected signal.

Preferably, the radio frequency passive probe is an oscillator or a transmission line type analog radio frequency passive probe, which modulates a radio frequency signal based on its environmental sensitive variable. It can be understood that, the radio frequency passive probe may be utilized for measuring a sensitive variable such as temperature, pressure, humidity, or vibration etc., and the reflected signal feature may include signal amplitude, frequency, phase, power, time delay etc.

Further, it can be understood that, in the other embodiments of the present invention, the above sensor may also utilize other DC or AC power supply circuit, and the analog sensing module may also utilize an analog sensing device which needs a power supply, without affecting implementation of technical solution of the present invention.

A combination of the above respective improvements forms a preferred embodiment of the present invention, but respective improvements may also be utilized separately.

This embodiment is the method embodiment corresponding to the second embodiment, and this embodiment and the second embodiment can be implemented in cooperation with each other. The correlated technical details disclosed in the second embodiment are still effective in this embodiment and will not be repeated here in order to reduce redundancy. Correspondingly, the correlated technical details disclosed in this embodiment can also be applied in the second embodiment.

Figure 10:
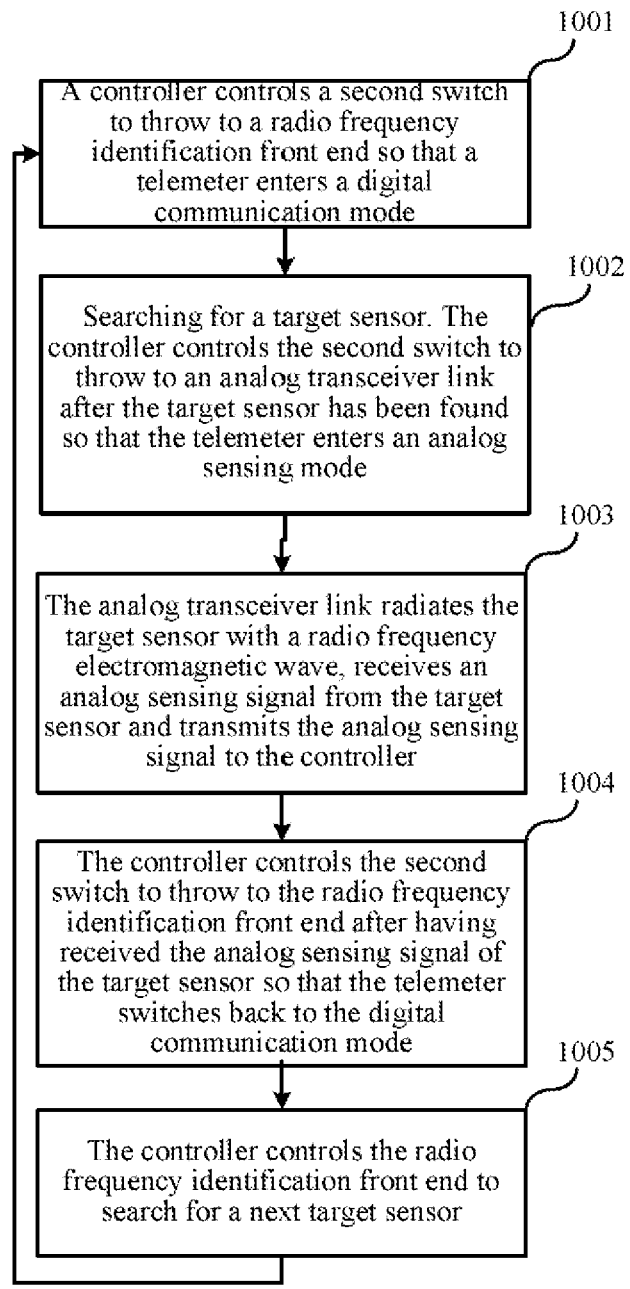
FIG. 10 is a flow chart for a use method of a telemeter according to the eighth embodiment of the present invention.

The eighth embodiment of the present invention relates to a use method of telemeter. FIG. 10 is a flowchart of the use method of telemeter.

The telemeter comprises a second switch, a radio frequency identification front end, an analog transceiver link and a controller, and the second switch selects an analog transceiver link or a radio frequency identification front end to communicate with a sensor. As shown in FIG. 10, the use method of telemeter comprises the following steps:

in step 1001, a controller controls the second switch to throw to the radio frequency identification front end so that the telemeter enters the digital communication mode;

then it proceeds to step 1002, wherein the controller controls the radio frequency identification front end to search for a target sensor according to whether a target address code matches with a preset address code of the sensor, and the controller controls the second switch to throw to the analog transceiver link after having found the target sensor so that the telemeter enters the analog sensing mode;

then it proceeds to step 1003, wherein the analog transceiver link radiates the target sensor with a radio frequency electromagnetic wave, receives an analog sensing signal from the target sensor and transmits the analog sensing signal to the controller; it can be understood that, in other embodiments of the present invention, the analog transceiver link may not radiate the target sensor with the radio frequency electromagnetic wave and only receives the analog sensing signal from the target sensor;

then it proceeds to step 1004, wherein the controller controls the second switch to throw to the radio frequency identification front end after having received the analog sensing signal of the target sensor so that the telemeter switches back to the digital communication mode;

then it proceeds to step 1005, wherein the controller controls the radio frequency identification front end to search for next target sensor.

It can be understood that, the telemeter does not necessarily switch back to the digital communication mode immediately after having received the analog sensing signal, and may also switch back to the digital communication mode after having entered the analog sensing mode for a predetermined time which is longer than a transmission time of the analog sensing signal.

Further, it can be understood that, the above digital communication mode and the analog sensing mode can work at a same frequency or at different frequencies. A typical work bandwidth is 1 MHz to 20 MHz.

Two different addressing control mechanisms are proposed in order to apply to applications in different scales. A direct chip-select mechanism is utilized in large-scale applications, while a sensor active reporting mechanism is utilized in small-scale systems. Specifically:

The step 1002 may comprise the following steps:

the controller controls the radio frequency identification front end to transmit the target address code to a sensor;

the radio frequency identification front end receives a response signal from the target sensor and transmits the response signal to the controller;

the controller controls the second switch to throw to the analog transceiver link after having received the response signal of the target sensor whose preset address code matches with the target address code, so that the telemeter enters the analog sensing mode.

The telemeter performs a direct chip select of a target sensor; if the preset address code of the sensor itself is different from the target address code, the sensor maintains the digital communication mode and keeps silent, and if they are same, the sensor switches to the analog sensing mode and reflects a sensing signal, thus helping to reduce the time of traversing all sensors and to increase a telemetry frequency.

Optionally, the step 1002 may also comprise the following steps:

the controller controls the radio frequency identification front end to transmit a digital communication command to a communication area;

the radio frequency identification front end receives a preset address code from each sensor;

the controller judges whether a preset address code received by the radio frequency identification front end has a conflict, and optionally whether a preset address code received by the radio frequency identification front end matches with the target address code; if there is a conflict or it is not matched, the controller continues controlling the radio frequency identification front end to transmit the digital communication command to the communication area, and continues judging whether a preset address code received by the radio frequency identification front end matches with the target address code, otherwise the controller controls the radio frequency identification front end to transmit an analog sensing command to the communication area and controls the second switch to throw to the analog transceiver link so that the telemeter enters the analog sensing mode.

Each sensor actively transmits its own preset address code and transmits the preset address code again after a random time delay when it does not receive an analog sensing command, the telemeter transmits the digital communication command or the analog sensing command according to a decision made on whether the address codes have a conflict or whether the address codes are matched, and each sensor decides whether it should switch its own work mode according to whether the sensor has received the analog sensing command and whether the sensor has transmitted the address code lately. When sensors have a small scale, the telemeter may traverse respective sensors within its communication area one by one via a reasonable time delay algorithm and after a sufficiently long time. This can reduce a complexity of a sensor circuit, and reduce an average transmitting power of the telemeter and interferences of adjacent telemeters.

Further, it can be understood that, in other embodiments of the present invention, other communication means can also be utilized to perform an addressing control.

In the present embodiment, the controller in the telemeter controls the radio frequency identification front end to search for the target sensor according to whether a target address code matches with a preset address code of the sensor, and throws the second switch to the analog transceiver link after the target sensor has been found so as to perform an analog communication with the target sensor, so that the above telemeter is switched between the digital communication mode and the analog sensing mode. Utilizing only address codes to perform a chip select of sensors can fundamentally avoid conflicts between a plurality of sensors within same communication area, the telemeter can communicate with respective sensors one by one, and a limited code length can be utilized to provide a great address space, thus reliably increasing sensor capacity within a frequency band and measurement accuracy and speed. Furthermore, utilizing an analog signal to extract a sensitive variable to be measured avoids utilizing a complex, power consuming digitization and corresponding frame circuit, reduces a power consumption and expands a communication scope, so that sensors can be utilized in a near-field coupling and an intermediate-remote distance telemetry.

This embodiment is the method embodiment corresponding to the third embodiment, and this embodiment and the third embodiment can be implemented in cooperation with each other. The correlated technical details disclosed in the third embodiment are still effective in this embodiment and will not be repeated here in order to reduce redundancy. Correspondingly, the correlated technical details disclosed in this embodiment can also be to applied in the third embodiment.

The ninth embodiment of the present invention relates to a use method of telemeter. The ninth embodiment is improved based on the eighth embodiment, and the main improvement is as follows: a sensitive variable to be measured is extracted by transmitting a radio frequency signal to a sensor and receiving a reflected signal, so that the sensor avoids utilizing a complex, power consuming digitization and corresponding frame circuit, also does not need sleeping and waking up and works passively on the whole. This greatly reduces a power consumption and expands a communication scope, and allows sensors to be utilized in a near-field coupling and an intermediate-remote distance telemetry.

Specifically, the analog transceiver link comprises an analog receiving link and an analog transmitting link, and the second switch further selects the analog receiving link and the analog transmitting link to communicate with a sensor.

In step 1002, the controller controls the second switch to throw to the analog transmitting link after having found the target sensor so that the telemeter enters the analog sensing mode;

It further comprises the following steps after step 1002:

the controller controls the analog transmitting link to transmit a radio frequency signal to the target sensor;

the controller controls the second switch to throw to the analog receiving link, and the analog receiving link receives a reflected signal from the target sensor and transmits the reflected signal to the controller;

the controller controls the second switch to throw to the radio frequency identification front end after having received the reflected signal of the target sensor so that the telemeter switches back to the digital communication mode.

Further, preferably, the use method of the telemeter comprises the following step:

the controller controls the radio frequency identification front end to emit a radio frequency electromagnetic radiation to the communication area so as to charge a sensor.

Further, it can be understood that, the telemeter may charge the sensor once the telemeter has been started, may also charge the sensor when it communicates with the sensor, and may also charge the sensor after it has communicated with the sensor.

A combination of the above respective improvements forms a preferred embodiment of the present invention, but respective improvements may also be utilized separately.

This embodiment is the method embodiment corresponding to the fourth embodiment, and this embodiment and the fourth embodiment can be implemented in cooperation with each other. The correlated technical details disclosed in the fourth embodiment are still effective in this embodiment and will not be repeated here in order to reduce redundancy. Correspondingly, the correlated technical details disclosed in this embodiment can also be applied in the fourth embodiment.

The tenth embodiment of the present invention relates to a use method of wireless sensor system, which comprises a use method of the sensors described in the sixth, seventh embodiment and a use method of the telemeters described in the eighth, ninth embodiment.

Preferably, the wireless sensor system further comprises a data center, and the data center transmits a boot command to the telemeter via a data bus at initial.

The use method of wireless sensor system further comprises the following steps:

the telemeter transmits the sensitive variable extracted from the analog sensing signal of the target sensor and corresponding target address code to the data center;

the data center receives, stores and forwards the sensitive variable and the target address code transmitted by the telemeter.

The specific use method of wireless sensor system will be introduced as follows in combination with FIGS. 11-14, respectively.

As a preferred example of the present invention, a direct chip-select method is utilized for selecting and activating a sensor according to a predetermined address code from a plurality of sensors within a same communication area and for performing a telemetry of a sensitive variable of the sensor. The method relates to apparatuses such as the data center, the telemeter and a plurality of sensors etc., as well as the signaling and responses between the respective apparatuses. The present embodiment is illustrated by using two sensors as an example, but it is not limited to two sensors when it is implemented. FIG. 9 is a signaling timing for the direct chip-select method of the present preferred example.

Figure 11:
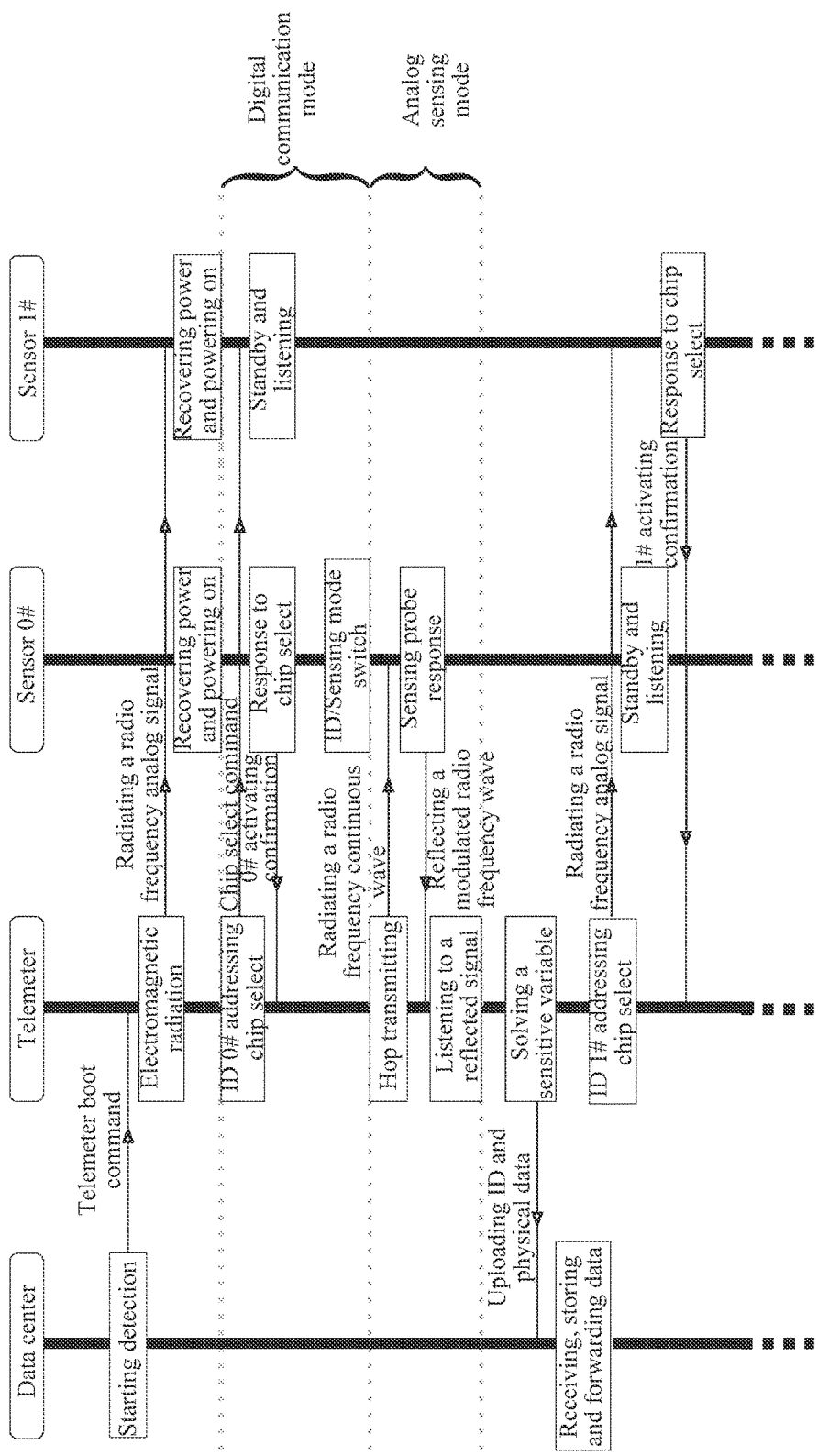
FIG. 11 is a signaling timing for a direct chip select method of a wireless sensor system according to the tenth embodiment of the present invention.

As shown in FIG. 11, when it is implemented, the data center 617 transmits a boot command to the telemetry controller 616 via a data bus. The telemeter enters the digital communication mode, and the digital-analog channel switch 615 throws to the digital radio frequency code identification front end 612. The digital radio frequency code identification to front end 612 emits a continuous electromagnetic wave radiation at a predetermined frequency such as 437 MHz in the present embodiment to the communication area through the antenna 611. The 0# sensor and 1# sensor both receive the electromagnetic radiation, and their built-in rectifiers 302 recover a direct current and charge the energy storage members 303 so as to complete a power on operation of the sensors. The telemeter transmits an addressing chip-select command for a sensor after a predetermined time, assuming addressing for 0# sensor. The addressing command is received by each sensor, and compared with each preset address code by each radio frequency identification tag 305. If they are same, 0# sensor reflects a response signal through the antenna 301 to confirm being activated, automatically shifts its digital-analog mode switch 307 from an off state to a chosen sensing probe, and enters the analog sensing mode. While 1# sensor is not selected, and thus enters the standby listening state without response and without changing its work state. The telemeter switches to the analog sensing mode after having received an activating confirmation signal, and adjusts the digital-analog channel switch 615 to the analog radio frequency signal transmitting link 613. The link is in accordance with a predetermined frequency band such as transmitting a radio frequency continuous wave at a predetermined stepping from 435 MHz to 439 MHz and maintaining each frequency point for 10 microseconds in the present embodiment. After the radiation at each frequency point is completed, the digital-analog channel switch 615 shifts to the receiving link 614 so as to listen to the analog reflected signal of 0# sensor. The controller 616 calculates the sensitive variable measured by the radio frequency passive probe according to the transmitted signal features within the frequency band, and reports the sensitive variable with the sensor address code to the data center, wherein the transmitted signal features include amplitude, frequency, phase, power, time delay etc., and the sensitive variables include parameters (i.e. physical data) such as temperature, pressure, humidity, vibration etc. The data center completes receiving, storing and forwarding the measured values.

The 0# sensor automatically switches back to the digital communication mode after a predetermined time, and maintains a standby listening state. The telemeter also automatically switches back to the digital communication mode, and performs an addressing of 1# sensor. The 1# sensor activates a response and switches its state, and the subsequent process is the same as the above.

In this way, the telemeter may traverse each sensor within its communication area one by one. The reflected signal feature utilized by the method can be reliably utilized in both near-field coupling and intermediate-remote distance applications, meanwhile a plurality of sensors are allowed to coexist within a communication area without interference with each other, and communication with respective sensors one by one may be performed, thus reliably increasing sensor capacity within a frequency band and measurement accuracy and speed. The method helps to reduce the time of traversing all sensors and to increase telemetry frequency.

Figure 12:
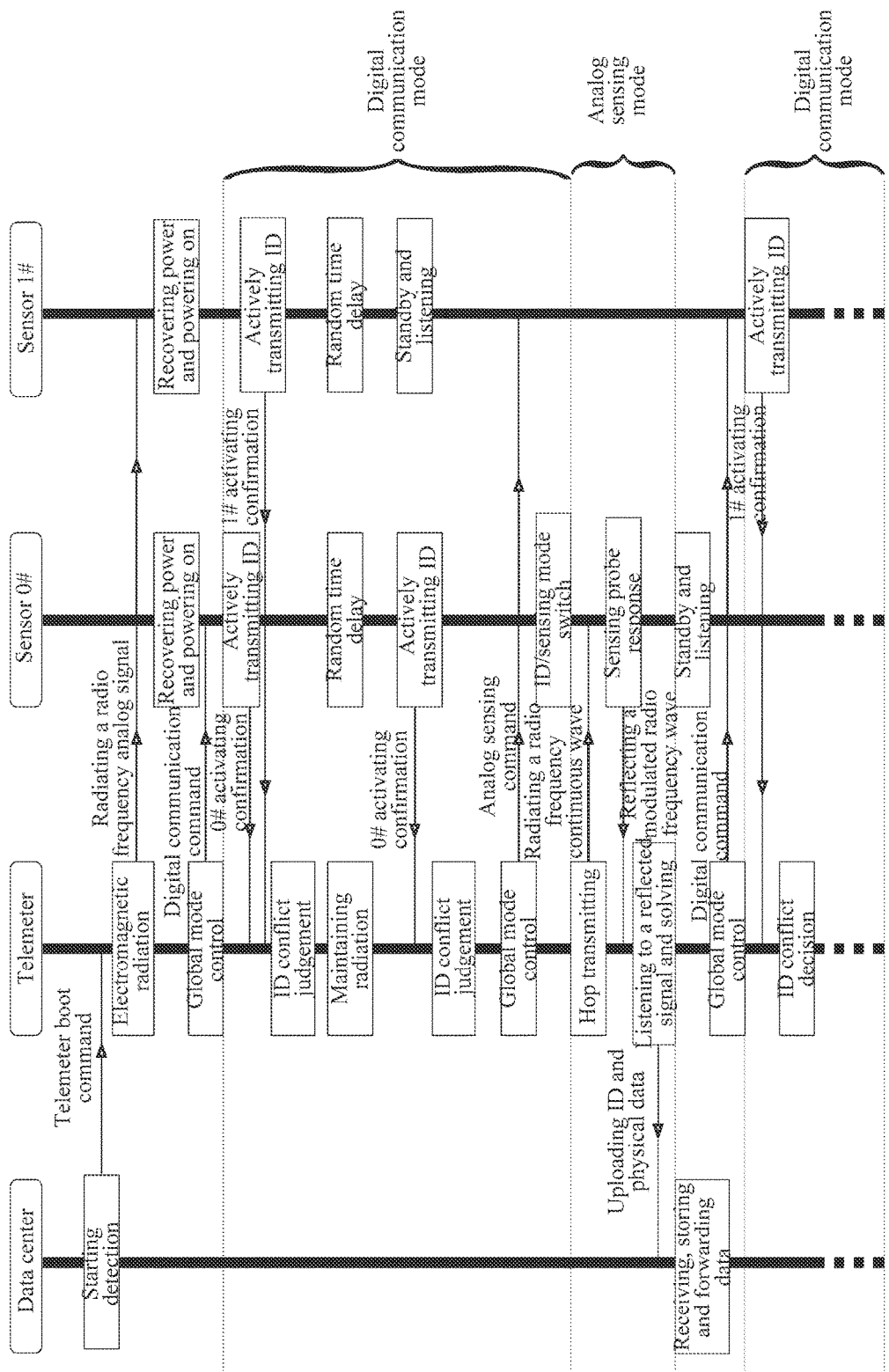
FIG. 12 is a signaling timing for an active reporting use method of a wireless sensor system according to the tenth embodiment of the present invention.

As another preferred example of the present invention, an active reporting method is utilized for gradually reducing address conflicts, for selecting a sensor according to a predetermined address code from a plurality of sensors within a same communication area and for performing a telemetry of a sensitive variable of the sensor. The method relates to apparatuses such as the data center, the telemeter and a plurality of sensors etc., and the signaling and responses between the respective apparatuses. The present embodiment is illustrated by taking two sensors as an example, but it is not limited to two sensors when it is implemented. FIG. 12 is a signaling timing for the active reporting method of the present preferred example.

As shown in FIG. 12, when it is implemented, the data center 617 transmits a boot command to the telemetry controller 616 via a data bus. The telemeter enters the digital communication mode, and the digital-analog channel switch 615 throws to the digital radio frequency code identification front end 612. The digital radio frequency code identification front end 612 emits a continuous electromagnetic wave radiation at a predetermined frequency such as 437 MHz in the present embodiment to the communication area through the antenna 611. The 0# sensor and 1# sensor both receive the electromagnetic radiation, and their built-in radio frequency rectifiers 302 recover a direct current and charge the energy storage members 303 so as to complete a power on operation of the sensors. The telemeter transmits a digital communication command to a communication area, and the 0# sensor and 1# sensor both actively reflect their preset address codes as an activating confirmation response after having received the command. The digital radio frequency code identification front end of the telemeter judges whether there is an address conflict. If there is a conflict, then the electromagnetic radiation is maintained. Each sensor, which has not received the analog sensing command of the telemeter for a predetermined wait time, transmits the address again after a random time relay independently set based on the respective last transmitting time. The telemeter continuously listens to an air interface signal, and modifies the global work mode command (comprising a digital communication command and an analog sensing command) according to a decision on if there is an address conflict, and if there is no conflict, then the telemeter transmits an analog sensing command. The sensor which has just finished transmitting an address, such as 0# sensor, switches into the analog sensing mode according to the analog sensing command, and switches its digital-analog mode switch 307 from an off state to a chosen sensing probe. While 1# sensor is still in a standby time delay at this time, and does not change its work state. The telemeter also switches to the analog sensing mode, and adjusts the digital-analog channel switch 615 to the analog radio frequency signal transmitting link 613. The link transmits a radio frequency continuous wave in accordance with a predetermined frequency band such as at a predetermined stepping from 435 MHz to 439 MHz and maintains each frequency point for 10 microseconds in the present embodiment. After the radiation at each frequency point is completed, the digital-analog channel switch 615 shifts to the receiving link 614 so as to listen to the analog reflected signal from 0# sensor. The controller 616 calculates the sensitive variables measured by the radio frequency passive probe according to the transmitted signal features within the frequency band, and reports the sensitive variable with the sensor address code to the data center, wherein the transmitted signal features include amplitude, frequency, phase, power, time delay etc., and the sensitive variables include parameters such as temperature, pressure, humidity, vibration etc. The data center completes receiving, storing and forwarding the measured values.

The 0# sensor automatically switches back to the digital communication mode after a predetermined time, maintains a standby listening state, and postpones the time of its next address reflecting according to a random time delay. The telemeter also automatically switches back to the digital communication mode. Then if 1# sensor has completed the time delay, it actively reflects an address again, and if there is no conflict, then the telemetry is carried out according to the above process.

When a time delay algorithm is reasonably set and sensors have a small scale, the telemeter may traverse respective sensors within its communication area one by one after a sufficiently long time. The method can reduce a complexity of a sensor chip select circuit, and reduce an average transmitting power of the telemeter and interferences from adjacent telemeters.

Further, it can be understood that, in other embodiments of the present invention, other communication means can also be utilized to perform a chip select.

Figure 13:
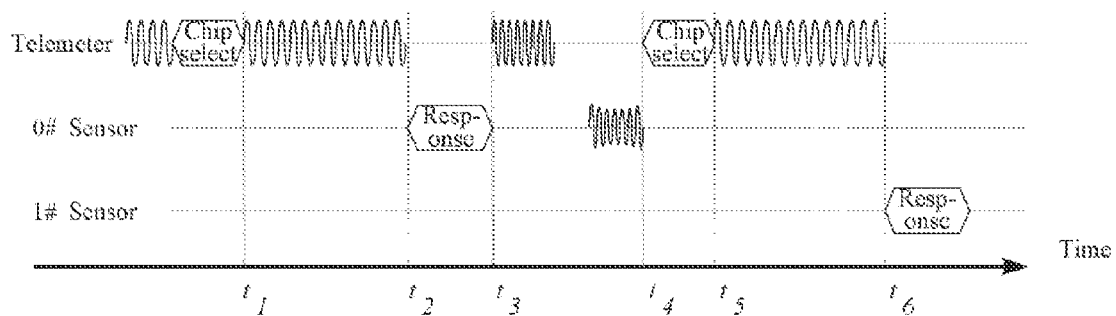
FIG. 13 is a data transmission timing for an air interface when utilizing the direct chip select method of FIG. 11 according to the tenth embodiment of the present invention.

FIG. 13 is an example of a data transmission timing for an air interface in the present invention, according to the signaling timing for the direct chip-select method in the present invention as shown in FIG. 11.

When it is implemented, the telemeter enters the digital communication mode, and the digital radio frequency code identification front end emits a continuous electromagnetic wave radiation to the communication area through the antenna. The 0# sensor and 1# sensor both receive the electromagnetic radiation and complete a power on operation. The telemeter transmits an addressing chip-select command for a sensor after a predetermined time, assuming addressing for 0# sensor. The addressing command is received by each sensor at $t_1$, and is compared with each preset address code. If they are same, 0# sensor reflects a response signal at $t_2$ to confirm being activated, and enters the analog sensing mode. While 1# sensor is not selected, and therefore enters the standby listening state without response and without changing its work state. The telemeter switches to the analog sensing mode at $t_3$ after having received an activating confirmation signal, and the analog radio frequency signal transmitting link transmits a radio frequency continuous wave at a predetermined stepping in accordance with a predetermined frequency band. After the radiation at each frequency point is completed, the analog radio frequency signal receiving link listens to the analog reflected signal from 0# sensor. The telemeter calculates the sensitive variables measured by the radio frequency passive probe according to the transmitted signal features within the frequency band, and reports the sensitive variables with the preset address code of the sensor to the data center, wherein the transmitted signal features include amplitude, frequency, phase, power, time delay etc., and the sensitive variables include parameters such as temperature, pressure, humidity, vibration etc. The data center completes receiving, storing and forwarding the measured values. The 0# sensor automatically switches back to the digital communication mode at $t_4$ after a predetermined time, and maintains a standby listening state. Meanwhile, the telemeter also automatically switches back to the digital communication mode, and performs an addressing for 1# sensor. The addressing command is received by each sensor at $t_5$, and compared with each preset address code. The 1# sensor activates a response and switches its state at $t_6$.

Figure 14:
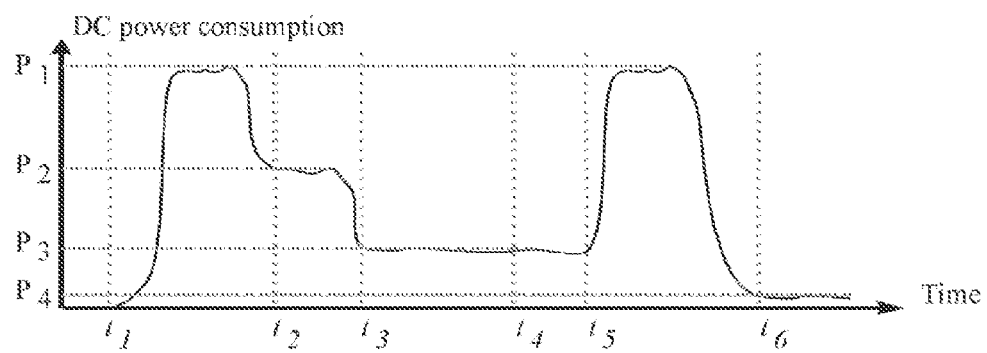
FIG. 14 is DC power consumption variations for a sensor when utilizing the direct chip select method of FIG. 11 according to the tenth embodiment of the present invention.

FIG. 14 is an example of DC power consumption variation for a sensor in the present invention, according to the signaling timing for the direct chip-select method in the present invention shown as in FIG. 11.

When it is implemented, the sensor receives the electromagnetic radiation of the telemeter and completes a power on operation. The addressing command is received by the sensor at $t_1$, and compared with the preset address code, during which a power consumption for the digital radio frequency code division multiple access chip select circuit operation is $P_1$. The sensor reflects a response signal at $t_2$ to confirm being activated and enters the analog sensing mode, and a power consumption for the reflected circuit operation and the switch shift operation is $P_2$. The telemeter switches to the analog sensing mode at $t_3$ after having received an activating confirmation signal, and the analog radio frequency signal transmitting link transmits a radio frequency continuous wave at a predetermined stepping in accordance with a predetermined frequency band. The sensor only needs to maintain the state of the multithrow switch to reflect the analog signal, and a total power consumption of the sensor is $P_3$. The sensor automatically switches back to the digital communication mode at $t_4$ after a predetermined time, and maintains a standby listening state. Meanwhile, the telemeter also automatically switches back to the digital communication mode, and performs an addressing for other sensors. The addressing command is received by the sensor at $t_5$, and compared with the preset address code, during which a power consumption for the digital radio frequency code division multiple access chip select circuit operation is $P_1$. The sensor decides that it is not selected at $t_6$, and enters a standby state, and a power consumption for the standby is $P_4$. It should be noted that, in the analog sensing mode which is entered at $t_3$, the inputs of the radio frequency rectifier and the radio frequency identification tag are both in a high impedance state, and therefore the total power consumption of the sensor $P_3$ is very low, and is much lower than the total power consumption $P_1$ for the digital radio frequency code division multiple access chip select circuit operation during the chip select. That is, the passive radio frequency probe of the hybrid sensor in the present embodiment does not add a power consumption, and the monitoring distance of the system is mainly determined by the power consumption of the digital communication part so that the range of the communication distance is large.

This embodiment is the method embodiment corresponding to the fifth embodiment, and this embodiment and the fifth embodiment can be implemented in cooperation with each other. The correlated technical details disclosed in the fifth embodiment are still effective in this embodiment and will not be repeated here in order to reduce redundancy. Correspondingly, the correlated technical details disclosed in this embodiment can also be applied in the fifth embodiment.

It should be explained that in the Claims and Description of the present invention, relationship terms such as first, second and the like are just utilized to distinguish one entity or manipulation from another entity or manipulation, instead of requiring or indicating any practical relation or sequence existing between these entities or manipulations. Moreover, the terms "include", "comprise" or any other variants indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "comprise a" does not exclude additional same elements existing in the process, method, article or equipment of this element.

By referring to certain preferred embodiments of the present invention, the present invention has been shown and described. But it should be understood by those skilled in the art that various other changes in the forms and details may be made without departing rom the principles and scope of the invention.

What is claimed:

1. A sensor, wherein the sensor comprises:
a radio frequency identification tag which performs a digital communication with a telemeter and judges whether a preset address code matches with a target address code of the telemeter according to a digital communication signal received from the telemeter in a digital communication mode; and if not matched, the sensor maintains the digital communication mode, and if matched, the sensor is a target sensor, and the radio frequency identification tag of the target sensor turns on a first switch so that the target sensor enters an analog sensing mode; in the analog sensing mode, input of the radio frequency identification tag of the target sensor is in a high impedance state, and the radio frequency identification tag of the target sensor turns off the first switch after an analog sensing module has reflected an analog sensing signal so that the target sensor switches back to the digital communication mode;
the first switch which turns on or turns off an analog communication between the analog sensing module and the telemeter; and
the analog sensing module which reflects the analog sensing signal to the telemeter in the analog sensing mode.

2. The sensor according to claim 1, wherein the radio frequency identification tag receives the target address code from the telemeter and judges whether the target address code matches with the preset address code in the digital communication mode; and if not matched, the sensor maintains the digital communication mode, otherwise the sensor is a target sensor, and the radio frequency identification tag of the target sensor transmits a response signal to the telemeter and turns on the first switch so that the target sensor enters the analog sensing mode.

3. The sensor according to claim 1, wherein the radio frequency identification tag receives a digital communication command from the telemeter and then actively transmits a preset address code to the telemeter in the digital communication mode, and the telemeter judges whether the preset address code matched with the target address code has been found; if there is no match, the radio frequency identification tag transmits the preset address code to the telemeter again after a random time delay and judges whether the telemeter has transmitted an analog sensing command, and if there is a match, the telemeter transmits the analog sensing command, meanwhile the radio frequency identification tag judges whether the preset address code has been transmitted within a preset time threshold before receiving the analog sensing command; if it is, the sensor is a target sensor, and the radio frequency identification tag of the target sensor turns on the first switch so that the target sensor enters the analog sensing mode; otherwise, the sensor maintains the digital communication mode.

4. The sensor according to claim 1, wherein the sensor further comprises a radio frequency rectifier and an energy storage member;
the radio frequency rectifier transforms a radio frequency electromagnetic radiation received from the telemeter into a direct current so as to charge the energy storage member;
the energy storage member supplies power to the radio frequency identification tag and the first switch.

5. The sensor according to claim 1, wherein the analog sensing module is a radio frequency passive probe which receives a radio frequency signal from the telemeter and transmits a reflected signal to the telemeter in the analog sensing mode;
the radio frequency identification tag turns off the first switch to switch the target sensor back to the digital communication mode after the radio frequency passive probe has transmitted the reflected signal.

6. The sensor according to claim 5, wherein the radio frequency passive probe is an oscillator or a transmission line type analog radio frequency passive probe, which modulates the radio frequency signal according to its environmental sensitive variable.

7. The sensor according to claim 1, wherein the sensor has a plurality of analog sensing modules, and the first switch is a multithrow switch which selects an analog sensing module to perform an analog communication with the telemeter;
the radio frequency identification tag presets multilevel address codes which respectively correspond with the sensor and its analog sensing module, and after the preset address code has been confirmed matching with the target address code of the telemeter, the radio frequency identification tag is selected and controls the first switch to throw to the selected analog sensing module according to a secondary address code so that the target sensor enters the analog sensing mode.

8. A telemeter, wherein the telemeter comprises:
a second switch which selects an analog transceiver link or a radio frequency identification front end to communicate with a sensor;
a radio frequency identification front end;
an analog transceiver link which radiates a target sensor with a radio frequency electromagnetic wave, receives an analog sensing signal from the target sensor and transmits the analog sensing signal to a controller in an analog sensing mode; and
the controller which controls the second switch to throw to the radio frequency identification front end and controls the radio frequency identification front end to search for the target sensor according to whether a target address code matches with a preset address code of the sensor in a digital communication mode; the controller controls the second switch to throw to the analog transceiver link after the target sensor has been found so that the telemeter enters the analog sensing mode; in the analog sensing mode, the radio frequency identification front end stops work, and the controller controls the second switch to throw to the radio frequency identification front end after having received the analog sensing signal of the target sensor so that the telemeter switches back to the digital communication mode.

9. The telemeter according to claim 8, wherein the controller controls the radio frequency identification front end to transmit the target address code to the sensor and controls the second switch to throw to the analog transceiver link after having received a response signal from the target sensor whose preset address code matches with the target address code in the digital communication mode, so that the telemeter enters the analog sensing mode;
the radio frequency identification front end receives the response signal from the target sensor and transmits the response signal to the controller.

10. The telemeter according to claim 8, wherein the controller controls the radio frequency identification front end to transmit a digital communication command to a communication area in the digital communication mode, and the controller judges whether a preset address code received from a sensor by the radio frequency identification front end matches with the target address code; if not matched, the controller continues controlling the radio frequency identification front end to transmit the digital communication command to the communication area, and continues judging whether a preset address code received by the radio frequency identification front end matches with the target address code; if matched, the controller controls the radio frequency identification front end to transmit an analog sensing command to the communication area, and controls the second switch to throw to the analog transceiver link so that the telemeter enters the analog sensing mode;
the radio frequency identification front end receives the preset address code from the sensor.

11. The telemeter according to claim 8, wherein the controller further controls the radio frequency identification front end to emit a radio frequency electromagnetic radiation to the communication area so as to charge the sensor.

12. The telemeter according to claim 8, wherein the analog transceiver link comprises an analog receiving link and an analog transmitting link, and the second switch selects the analog receiving link and the analog transmitting link to communicate with the sensor;
the analog receiving link in the analog sensing mode receives a reflected signal from the target sensor and transmits the reflected signal to the controller;
the controller in the digital communication mode further controls the second switch to throw to the analog transmitting link after the target sensor has been found so that the telemeter enters the analog sensing mode; in the analog sensing mode, the controller controls the analog transmitting link to transmit a radio frequency signal to the target sensor, controls the second switch to throw to the analog receiving link and controls the second switch to throw to the radio frequency identification front end after having received the reflected signal of the target sensor so that the telemeter switches back to the digital communication mode.

13. A wireless sensor system, wherein the wireless sensor system comprises a telemeter according to claim 8.

14. A use method of a sensor, wherein the sensor comprises a radio frequency identification tag, a first switch and an analog sensing module, and the first switch turns on or turns off an analog communication between the analog sensing module and a telemeter; the use method comprises the following steps:
in a digital communication mode, the radio frequency identification tag performs a digital communication with the telemeter and judges whether a preset address code matches with a target address code of the telemeter according to a digital communication signal received from the telemeter; if not matched, the sensor maintains the digital communication mode, and if matched, the sensor is a target sensor, and the radio frequency identification tag of the target sensor turns on the first switch so that the target sensor enters an analog sensing mode;
in the analog sensing mode, the analog sensing module reflects an analog sensing signal to the telemeter, input of the radio frequency identification tag is in a high impedance state, and the radio frequency identification tag turns off the first switch after the analog sensing module has reflected the analog sensing signal so that the target sensor switches back to the digital communication mode.

15. The use method of a sensor according to claim 14, wherein in the digital communication mode, the use method comprises the following steps:
the radio frequency identification tag receives the target address code from the telemeter;
the radio frequency identification tag judges whether the target address code matches with the preset address code; if not matched, the sensor maintains the digital communication mode; otherwise the sensor is a target sensor, and the radio frequency identification tag of the target sensor transmits a response signal to the telemeter and turns on the first switch so that the target sensor enters the analog sensing mode.

16. The use method of a sensor according to claim 14, wherein in the digital communication mode, the use method comprises the following steps:
the radio frequency identification tag receives a digital communication command from the telemeter;
the radio frequency identification tag actively transmits a preset address code to the telemeter after having received the digital communication command;
the telemeter judges whether the preset address code matched with the target address code has been found; if there is no match, the radio frequency identification tag transmits the preset address code to the telemeter again after a random time delay and judges whether the telemeter has transmitted an analog sensing command, and if there is a match, the telemeter transmits the analog sensing command; meanwhile the radio frequency identification tag judges whether the preset address code has been transmitted within a preset time threshold before receiving the analog sensing command; if it is, the sensor is a target sensor, the radio frequency identification tag of the target sensor turns on the first switch so that the target sensor enters the analog sensing mode, otherwise the sensor maintains the digital communication mode.

17. A use method of a telemeter, wherein, the telemeter comprises a second switch, a radio frequency identification front end, an analog transceiver link and a controller, and the second switch selects the analog transceiver link or the radio frequency identification front end to communicate with a sensor; the use method comprises the following steps:

the controller controls the second switch to throw to the radio frequency identification front end so that the telemeter enters a digital communication mode;

the controller controls the radio frequency identification front end to search for a target sensor according to whether a target address code matches with a preset address code of the sensor, and the controller controls the second switch to throw to the analog transceiver link after the target sensor has been found so that the telemeter enters the analog sensing mode, in the analog sensing mode, the radio frequency identification front end stops work;

the analog transceiver link radiates the target sensor with a radio frequency electromagnetic wave, receives an analog sensing signal from the target sensor and transmits the analog sensing signal to the controller;

the controller controls the second switch to throw to the radio frequency identification front end after having received the analog sensing signal of the target sensor so that the telemeter switches back to the digital communication mode, and controls the radio frequency identification front end to search for a next target sensor.

18. The use method of a telemeter according to claim 17, wherein in the step that the controller controls the radio frequency identification front end to search for a target sensor according to whether a target address code matches with a preset address code of the sensor, it comprises the following steps:

the controller controls the radio frequency identification front end to transmit the target address code to the sensor;

the radio frequency identification front end receives a response signal from the target sensor and transmits the response signal to the controller;

the controller controls the second switch to throw to the analog transceiver link after having received the response signal of the target sensor whose preset address code matches with the target address code, so that the telemeter enters the analog sensing mode.

19. The use method of a telemeter according to claim 17, wherein, in the step that the controller controls the radio frequency identification front end to search for a target sensor according to whether a target address code matches with a preset address code of the sensor, it comprises the following steps:

the controller controls the radio frequency identification front end to transmit a digital communication command to a communication area;

the radio frequency identification front end receives the preset address code from the sensor;

the controller judges whether the preset address code received by the radio frequency identification front end matches with the target address code; if not matched, the controller continues controlling the radio frequency identification front end to transmit the digital communication command to the communication area, and continues judging whether the preset address code received by the radio frequency identification front end matches with the target address code; otherwise the controller controls the radio frequency identification front end to transmit an analog sensing command to the communication area, and controls the second switch to throw to the analog transceiver link so that the telemeter enters the analog sensing mode.

20. The use method of a telemeter according to claim 17, wherein the analog transceiver link comprises an analog receiving link and an analog transmitting link, and the second switch further selects the analog receiving link and the analog transmitting link to communicate with the sensor;

in the step that the controller controls the radio frequency identification front end to search for a target sensor according to whether a target address code matches with a preset address code of the sensor and the telemeter and the target sensor enter the analog sensing mode after the target sensor has been found, the controller controls the second switch to throw to the analog transmitting link after the target sensor has been found so that the telemeter enters the analog sensing mode;

after the step that the controller controls the radio frequency identification front end to search for a target sensor according to whether a target address code matches with a preset address code of the sensor and the telemeter and the target sensor enter the analog sensing mode after the target sensor has been found, it further comprises the following steps:

the controller controls the analog transmitting link to transmit a radio frequency signal to the target sensor;

the controller controls the second switch to throw to the analog receiving link, and the analog receiving link receives a reflected signal from the target sensor and transmits the reflected signal to the controller;

the controller controls the second switch to throw to the radio frequency identification front end after having received the reflected signal of the target sensor so that the telemeter switches back to the digital communication mode.

* * * * *